(12) United States Patent
Duan et al.

(10) Patent No.: US 12,369,132 B2
(45) Date of Patent: Jul. 22, 2025

(54) REFERENCE DEVICE HARDWARE GROUP DELAY CALIBRATION

(71) Applicant: QUALCOMM Incorporated, San Diego, CA (US)

(72) Inventors: Weimin Duan, San Diego, CA (US); Alexandros Manolakos, Escondido, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 17/348,553

(22) Filed: Jun. 15, 2021

(65) Prior Publication Data

US 2022/0015051 A1 Jan. 13, 2022

Related U.S. Application Data

(60) Provisional application No. 63/051,206, filed on Jul. 13, 2020.

(51) Int. Cl.
*H04W 4/029* (2018.01)
*H04B 17/318* (2015.01)
*H04W 56/00* (2009.01)
*H04W 64/00* (2009.01)

(52) U.S. Cl.
CPC ........ *H04W 56/004* (2013.01); *H04B 17/318* (2015.01); *H04W 4/029* (2018.02); *H04W 56/0065* (2013.01); *H04W 64/00* (2013.01)

(58) Field of Classification Search
CPC .................................................. H04W 56/004
USPC ....... 370/350, 240, 344, 352, 254, 252, 331, 370/316; 455/456.1, 441, 131, 196.1, 455/318, 456.6
See application file for complete search history.

(56) References Cited

U.S. PATENT DOCUMENTS

| | | | |
|---|---|---|---|
| 6,529,844 B1 * | 3/2003 | Kapetanic | H03L 7/22 324/613 |
| 6,693,588 B1 * | 2/2004 | Schlee | H01Q 3/267 342/368 |
| 8,749,682 B2 * | 6/2014 | Moore | H04N 25/677 341/169 |
| 10,551,479 B1 * | 2/2020 | Ylamurto | H04W 4/029 |

(Continued)

OTHER PUBLICATIONS

International Search Report and Written Opinion—PCT/US2021/037596—ISA/EPO—Jan. 21, 2022.

(Continued)

*Primary Examiner* — Joseph Arevalo
(74) *Attorney, Agent, or Firm* — Muncy, Geissler, Olds & Lowe, P.C.

(57) ABSTRACT

In an aspect, a communications node selects a reference device for a positioning procedure based on hardware group capabilities associated with reference devices involved in the positioning procedure (e.g., RTT, differential RTT, double differential RTT, TDOA, etc.). In another aspect, a distance between reference devices is estimated based on timing measurements of reference signal(s) for positioning. A hardware group delay associated with the reference devices is estimated based on (i) the estimated distance between the first and second reference devices, and (ii) a known distance between the first and second reference devices.

21 Claims, 13 Drawing Sheets

(56) References Cited

U.S. PATENT DOCUMENTS

| | | | | |
|---|---|---|---|---|
| 2008/0036649 | A1* | 2/2008 | Lyon | G01S 7/4052 |
| | | | | 342/174 |
| 2012/0264449 | A1* | 10/2012 | Kazmi | G01S 5/011 |
| | | | | 455/456.1 |
| 2013/0203447 | A1* | 8/2013 | Hannan | H04W 64/00 |
| | | | | 455/456.5 |
| 2015/0195674 | A1* | 7/2015 | Opshaug | G01S 5/02 |
| | | | | 455/456.6 |
| 2017/0038240 | A1* | 2/2017 | Honeck | G01S 13/88 |
| 2017/0367065 | A1* | 12/2017 | Seth | H04L 43/0864 |
| 2020/0029291 | A1* | 1/2020 | Siomina | H04W 56/0045 |
| 2020/0205104 | A1 | 6/2020 | Akkarakaran et al. | |

OTHER PUBLICATIONS

Partial International Search Report—PCT/US2021/037596—ISA/EPO—Nov. 5, 2021.

Qualcomm Incorporated: "Initial Thoughts on Potential Positioning Enhancements", 3GPP Draft, 3GPP TSG RAN WG1 #101-e, R1-2004492,3rd Gen Partnership Project(3GPP),Mobile Competence Centre,650,Route Des Lucioles,F-06921 Sophia-Antipolis Cedex,FR,vol. RAN WG1,No. e-mtg,May 25, 2020-Jun. 5, 2020, May 16, 2020(May 16, 2020), XP051886221,pp. 1-14,Retrieved from Internet:URL:https://ftp.3gpp.org/tsg_ran/WG1_RL1/TSGR1_101-e/Docs/R1-2004492.zip,R1-2004492.docx[Retrieved May 16, 2020],Secs 1-7,p. 13,Line 7-Line 27,p. 10,secs 4.1 5.1-5.2, 6-1.

Qualcomm Incorporated: "On gNB Requirements for NR Positioning", 3GPP Draft, 3GPP TSG-RAN WG4 Meeting #93, R4-1915183, 3rd Generation Partnership Project (3GPP), Mobile Competence Centre, 650, Route Des Lucioles, F-06921 Sophia-Antipolis Cedex, France, vol. RAN WG4, No. Reno, NV, USA, Nov. 18, 2019-Nov. 22, 2019, Nov. 8, 2019 (Nov. 8, 2019), XP051819421, pp. 1-7, Retrieved from the Internet: URL: https://ftp.3gpp.org/tsg_ran/WG4_Radio/TSGR4_93/Docs/R4-1915183.zip, [retrieved on Nov. 8, 2019], p. 5-p. 6, Section 3.

European Search Report—EP24187185—Search Authority—The Hague—Sep. 23, 2024.

* cited by examiner

REFERENCE DEVICE HARDWARE GROUP DELAY CALIBRATION

CROSS-REFERENCE TO RELATED APPLICATIONS

The present Application for Patent claims the benefit of U.S. Provisional Application No. 63/051,206, entitled "BASE STATION HARDWARE GROUP DELAY CALIBRATION," filed Jul. 13, 2020, assigned to the assignee hereof, and expressly incorporated herein by reference in its entirety.

BACKGROUND OF THE DISCLOSURE

1. Field of the Disclosure

Aspects of the disclosure relate generally to wireless communications and more particularly to reference device (e.g., base station or reference user equipment (UE)) hardware group delay.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a communications node includes obtaining a hardware group delay calibration capability associated with each of a plurality of reference devices; selecting a reference device from among the plurality of reference devices based at least on the hardware group delay calibration capabilities associated with the plurality of reference devices; and determining one or more timing measurements associated with each of the plurality of reference devices based on a reference hardware group delay calibration value associated with the selected reference device.

In some aspects, the plurality of reference devices comprise at least one base station, at least one reference UE, or a combination thereof.

In some aspects, the method includes transmitting a hardware group delay calibration capability request to each of the plurality of reference devices, wherein the obtaining comprises receiving the hardware group delay calibration capability for each of the plurality of reference devices in response to the request.

In some aspects, the determination is performed in association with a positioning procedure for a user equipment (UE).

In some aspects, the communications node corresponds to the UE, and the positioning procedure is a UE-based positioning procedure.

In some aspects, the communications node corresponds to a network device, and the positioning procedure is a network-based positioning procedure.

In some aspects, the positioning procedure corresponds to a round trip time (RTT) positioning procedure.

In some aspects, the positioning procedure corresponds to a differential RTT positioning procedure or a double differential RTT positioning procedure.

In some aspects, the positioning procedure corresponds to a time difference of arrival (TDOA)-based positioning procedure.

In some aspects, the determination is performed independent of any UE positioning procedure.

In some aspects, the hardware group delay calibration capabilities for each of the plurality of reference devices indicates a respective hardware group delay error range.

In some aspects, the selecting selects the selected reference device as the reference device associated with the narrowest hardware group delay error range.

In some aspects, the selecting selects the selected reference device based on the hardware group delay calibration capabilities associated with the plurality of reference devices and at least one secondary criteria.

In some aspects, the at least one secondary criteria comprises reference signal received power (RSRP) measurements between the plurality of reference devices and a user equipment (UE).

In some aspects, the hardware group delay calibration capability for at least one of the plurality of reference devices is specific to a particular set of frequency-domain resources, a particular set of beams, a particular transmission reception point (TRP).

In some aspects, the hardware group delay calibration capability for at least one of the plurality of reference devices is time-varying, and the obtaining obtains at least one parameter for modeling a time-varying function of the hardware group delay calibration capability the at least one reference device.

In some aspects, the obtaining comprises receipt of differential hardware group delay calibration capability information that is relative to previously received hardware group delay calibration capability information.

In an aspect, a method of operating a communications node includes obtaining an estimated distance between a first reference device and a second reference device that is based on one or more timing measurements of one or more reference signals for positioning between the first and second reference devices; and estimating a hardware group delay associated with the first and second reference devices based on (i) the estimated distance between the first and second reference devices, and (ii) a known distance between the first and second reference devices.

In some aspects, the first and second reference devices comprise at least one base station, at least one reference user equipment (UE), or a combination thereof.

In some aspects, the communications node corresponds to one of the first and second reference devices, or the communications node corresponds to a network entity separate from the first and second reference devices.

In some aspects, the one or more timing measurements are associated with a round trip time (RTT) measurement or a time difference of arrival (TDOA) measurement.

In some aspects, the first reference device is associated with a reference hardware group delay.

In some aspects, the estimating estimates a residual hardware group delay that corresponds to a differential between a hardware group delay of the second reference device and the reference hardware group delay of the first reference device.

In an aspect, a communications node includes a memory; at least one transceiver; and at least one processor communicatively coupled to the memory and the at least one transceiver, the at least one processor configured to: obtain a hardware group delay calibration capability associated with each of a plurality of reference devices; select a reference device from among the plurality of reference devices based at least on the hardware group delay calibration capabilities associated with the plurality of reference devices; and determine one or more timing measurements associated with each of the plurality of reference devices based on a reference hardware group delay calibration value associated with the selected reference device.

In some aspects, the plurality of reference devices comprise at least one base station, at least one reference UE, or a combination thereof.

In some aspects, the at least one processor is further configured to: transmit, via the at least one transceiver, a hardware group delay calibration capability request to each of the plurality of reference devices, wherein the obtaining comprises receiving the hardware group delay calibration capability for each of the plurality of reference devices in response to the request.

In some aspects, the determination is performed in association with a positioning procedure for a user equipment (UE).

In some aspects, the communications node corresponds to the UE, and the positioning procedure is a UE-based positioning procedure.

In some aspects, the communications node corresponds to a network device, and the positioning procedure is a network-based positioning procedure.

In some aspects, the positioning procedure corresponds to a round trip time (RTT) positioning procedure.

In some aspects, the positioning procedure corresponds to a differential RTT positioning procedure or a double differential RTT positioning procedure.

In some aspects, the positioning procedure corresponds to a time difference of arrival (TDOA)-based positioning procedure.

In some aspects, the determination is performed independent of any UE positioning procedure.

In some aspects, the hardware group delay calibration capabilities for each of the plurality of reference devices indicates a respective hardware group delay error range.

In some aspects, the selecting selects the selected reference device as the reference device associated with the narrowest hardware group delay error range.

In some aspects, the selecting selects the selected reference device based on the hardware group delay calibration capabilities associated with the plurality of reference devices and at least one secondary criteria.

In some aspects, the at least one secondary criteria comprises reference signal received power (RSRP) measurements between the plurality of reference devices and a user equipment (UE).

In some aspects, the hardware group delay calibration capability for at least one of the plurality of reference devices is specific to a particular set of frequency-domain resources, a particular set of beams, a particular transmission reception point (TRP).

In some aspects, the hardware group delay calibration capability for at least one of the plurality of reference devices is time-varying, and the obtaining obtains at least one parameter for modeling a time-varying function of the hardware group delay calibration capability the at least one reference device.

In some aspects, the obtaining comprises receipt of differential hardware group delay calibration capability information that is relative to previously received hardware group delay calibration capability information.

In an aspect, a communications node includes a memory; at least one transceiver; and at least one processor communicatively coupled to the memory and the at least one transceiver, the at least one processor configured to: obtain an estimated distance between a first reference device and a second reference device that is based on one or more timing measurements of one or more reference signals for positioning between the first and second reference devices; and estimate a hardware group delay associated with the first and second reference devices based on (i) the estimated distance between the first and second reference devices, and (ii) a known distance between the first and second reference devices.

In some aspects, the first and second reference devices comprise at least one base station, at least one reference user equipment (UE), or a combination thereof.

In some aspects, the communications node corresponds to one of the first and second reference devices, or the communications node corresponds to a network entity separate from the first and second reference devices.

In some aspects, the one or more timing measurements are associated with a round trip time (RTT) measurement or a time difference of arrival (TDOA) measurement.

In some aspects, the first reference device is associated with a reference hardware group delay.

In some aspects, the estimating estimates a residual hardware group delay that corresponds to a differential between a hardware group delay of the second reference device and the reference hardware group delay of the first reference device.

In an aspect, a communications node includes means for obtaining a hardware group delay calibration capability associated with each of a plurality of reference devices; means for selecting a reference device from among the plurality of reference devices based at least on the hardware group delay calibration capabilities associated with the plurality of reference devices; and means for determining one or more timing measurements associated with each of the plurality of reference devices based on a reference hardware group delay calibration value associated with the selected reference device.

In some aspects, the plurality of reference devices comprise at least one base station, at least one reference UE, or a combination thereof.

In some aspects, the method includes means for transmitting a hardware group delay calibration capability request to each of the plurality of reference devices, wherein the obtaining comprises receiving the hardware group delay calibration capability for each of the plurality of reference devices in response to the request.

In some aspects, the determination is performed in association with a positioning procedure for a user equipment (UE).

In some aspects, the communications node corresponds to the UE, and the positioning procedure is a UE-based positioning procedure.

In some aspects, the communications node corresponds to a network device, and the positioning procedure is a network-based positioning procedure.

In some aspects, the positioning procedure corresponds to a round trip time (RTT) positioning procedure.

In some aspects, the positioning procedure corresponds to a differential RTT positioning procedure or a double differential RTT positioning procedure.

In some aspects, the positioning procedure corresponds to a time difference of arrival (TDOA)-based positioning procedure.

In some aspects, the determination is performed independent of any UE positioning procedure.

In some aspects, the hardware group delay calibration capabilities for each of the plurality of reference devices indicates a respective hardware group delay error range.

In some aspects, the selecting selects the selected reference device as the reference device associated with the narrowest hardware group delay error range.

In some aspects, the selecting selects the selected reference device based on the hardware group delay calibration capabilities associated with the plurality of reference devices and at least one secondary criteria.

In some aspects, the at least one secondary criteria comprises reference signal received power (RSRP) measurements between the plurality of reference devices and a user equipment (UE).

In some aspects, the hardware group delay calibration capability for at least one of the plurality of reference devices is specific to a particular set of frequency-domain resources, a particular set of beams, a particular transmission reception point (TRP).

In some aspects, the hardware group delay calibration capability for at least one of the plurality of reference devices is time-varying, and the obtaining obtains at least one parameter for modeling a time-varying function of the hardware group delay calibration capability the at least one reference device.

In some aspects, the obtaining comprises receipt of differential hardware group delay calibration capability information that is relative to previously received hardware group delay calibration capability information.

In an aspect, a communications node includes means for obtaining an estimated distance between a first reference device and a second reference device that is based on one or more timing measurements of one or more reference signals for positioning between the first and second reference devices; and means for estimating a hardware group delay associated with the first and second reference devices based on (i) the estimated distance between the first and second reference devices, and (ii) a known distance between the first and second reference devices.

In some aspects, the first and second reference devices comprise at least one base station, at least one reference user equipment (UE), or a combination thereof.

In some aspects, the communications node corresponds to one of the first and second reference devices, or the communications node corresponds to a network entity separate from the first and second reference devices.

In some aspects, the one or more timing measurements are associated with a round trip time (RTT) measurement or a time difference of arrival (TDOA) measurement.

In some aspects, the first reference device is associated with a reference hardware group delay.

In some aspects, the estimating estimates a residual hardware group delay that corresponds to a differential between a hardware group delay of the second reference device and the reference hardware group delay of the first reference device.

In an aspect, a non-transitory computer-readable medium storing computer-executable instructions that, when executed by a communications node, cause the communications node to: obtain a hardware group delay calibration capability associated with each of a plurality of reference devices; select a reference device from among the plurality of reference devices based at least on the hardware group delay calibration capabilities associated with the plurality of reference devices; and determine one or more timing measurements associated with each of the plurality of reference devices based on a reference hardware group delay calibration value associated with the selected reference device.

In some aspects, the plurality of reference devices comprise at least one base station, at least one reference UE, or a combination thereof.

In some aspects, the one or more instructions further cause the communications node to: transmit a hardware group delay calibration capability request to each of the plurality of reference devices, wherein the obtaining comprises receiving the hardware group delay calibration capability for each of the plurality of reference devices in response to the request.

In some aspects, the determination is performed in association with a positioning procedure for a user equipment (UE).

In some aspects, the communications node corresponds to the UE, and the positioning procedure is a UE-based positioning procedure.

In some aspects, the communications node corresponds to a network device, and the positioning procedure is a network-based positioning procedure.

In some aspects, the positioning procedure corresponds to a round trip time (RTT) positioning procedure.

In some aspects, the positioning procedure corresponds to a differential RTT positioning procedure or a double differential RTT positioning procedure.

In some aspects, the positioning procedure corresponds to a time difference of arrival (TDOA)-based positioning procedure.

In some aspects, the determination is performed independent of any UE positioning procedure.

In some aspects, the hardware group delay calibration capabilities for each of the plurality of reference devices indicates a respective hardware group delay error range.

In some aspects, the selecting selects the selected reference device as the reference device associated with the narrowest hardware group delay error range.

In some aspects, the selecting selects the selected reference device based on the hardware group delay calibration capabilities associated with the plurality of reference devices and at least one secondary criteria.

In some aspects, the at least one secondary criteria comprises reference signal received power (RSRP) measurements between the plurality of reference devices and a user equipment (UE).

In some aspects, the hardware group delay calibration capability for at least one of the plurality of reference devices is specific to a particular set of frequency-domain resources, a particular set of beams, a particular transmission reception point (TRP).

In some aspects, the hardware group delay calibration capability for at least one of the plurality of reference devices is time-varying, and the obtaining obtains at least one parameter for modeling a time-varying function of the hardware group delay calibration capability the at least one reference device.

In some aspects, the obtaining comprises receipt of differential hardware group delay calibration capability information that is relative to previously received hardware group delay calibration capability information.

In an aspect, a non-transitory computer-readable medium storing computer-executable instructions that, when executed by a communications node, cause the communications node to: obtain an estimated distance between a first reference device and a second reference device that is based on one or more timing measurements of one or more reference signals for positioning between the first and second reference devices; and estimate a hardware group delay associated with the first and second reference devices based on (i) the estimated distance between the first and second reference devices, and (ii) a known distance between the first and second reference devices.

In some aspects, the first and second reference devices comprise at least one base station, at least one reference user equipment (UE), or a combination thereof.

In some aspects, the communications node corresponds to one of the first and second reference devices, or the communications node corresponds to a network entity separate from the first and second reference devices.

In some aspects, the one or more timing measurements are associated with a round trip time (RTT) measurement or a time difference of arrival (TDOA) measurement.

In some aspects, the first reference device is associated with a reference hardware group delay.

In some aspects, the estimating estimates a residual hardware group delay that corresponds to a differential between a hardware group delay of the second reference device and the reference hardware group delay of the first reference device.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
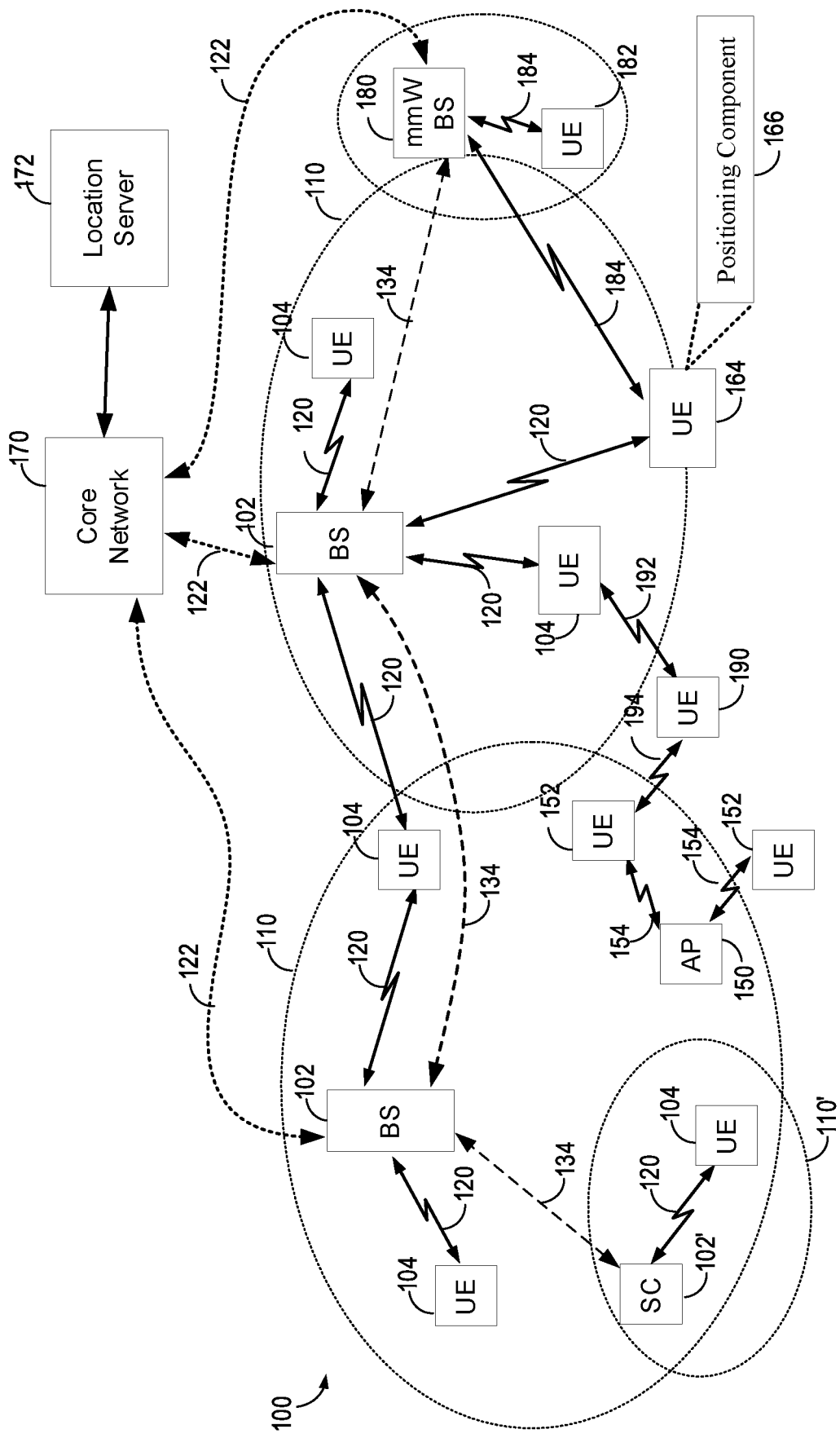
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164. In an aspect, the UE 164 may include a positioning component 166 that may enable the UE 164 to perform the UE operations described herein. Note that although only one UE in FIG. 1 is illustrated as having fully staggered SRS component 166, any of the UEs in FIG. 1 may be configured to perform the UE operations described herein.

Figure 2A:
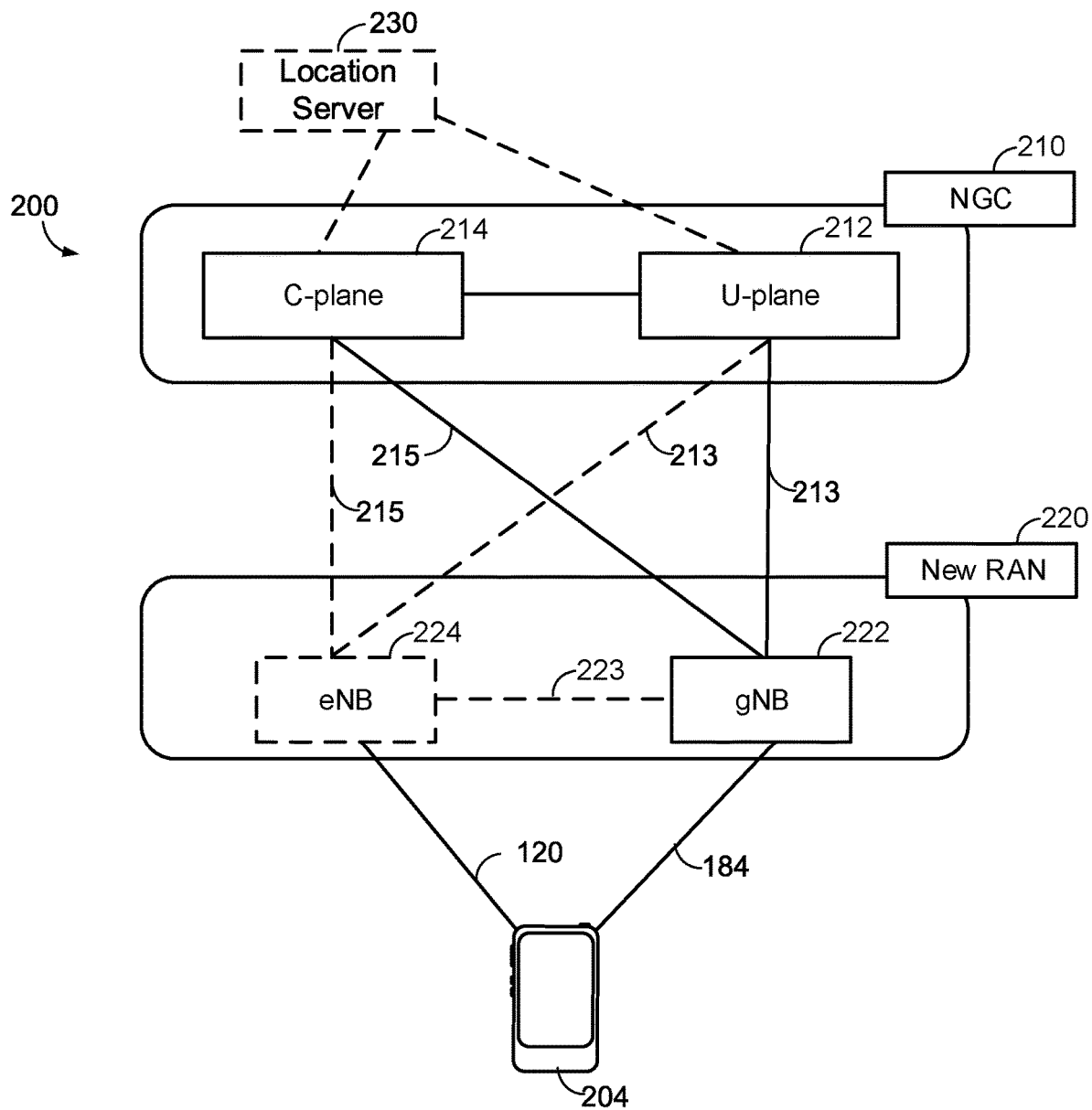
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
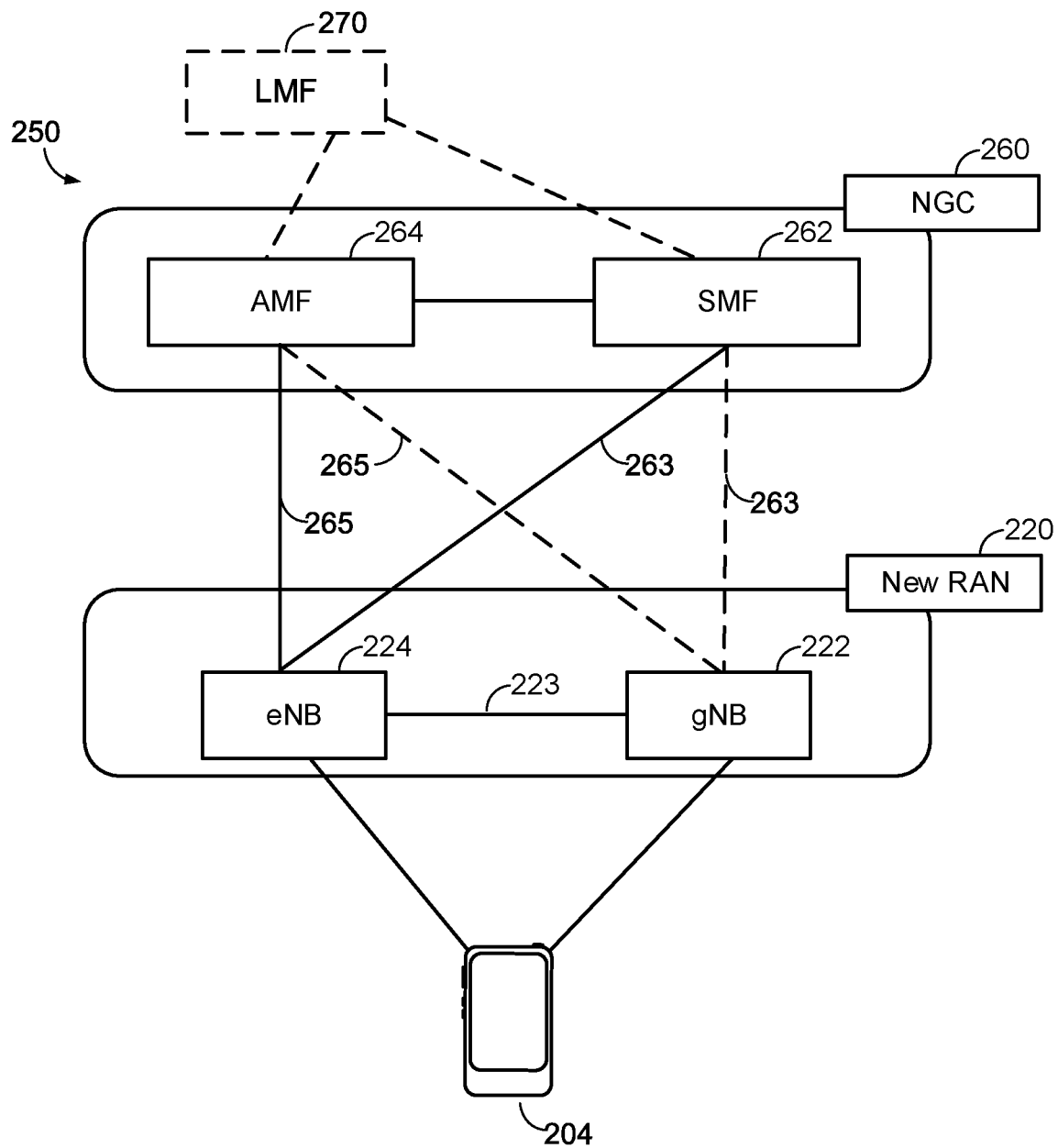

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
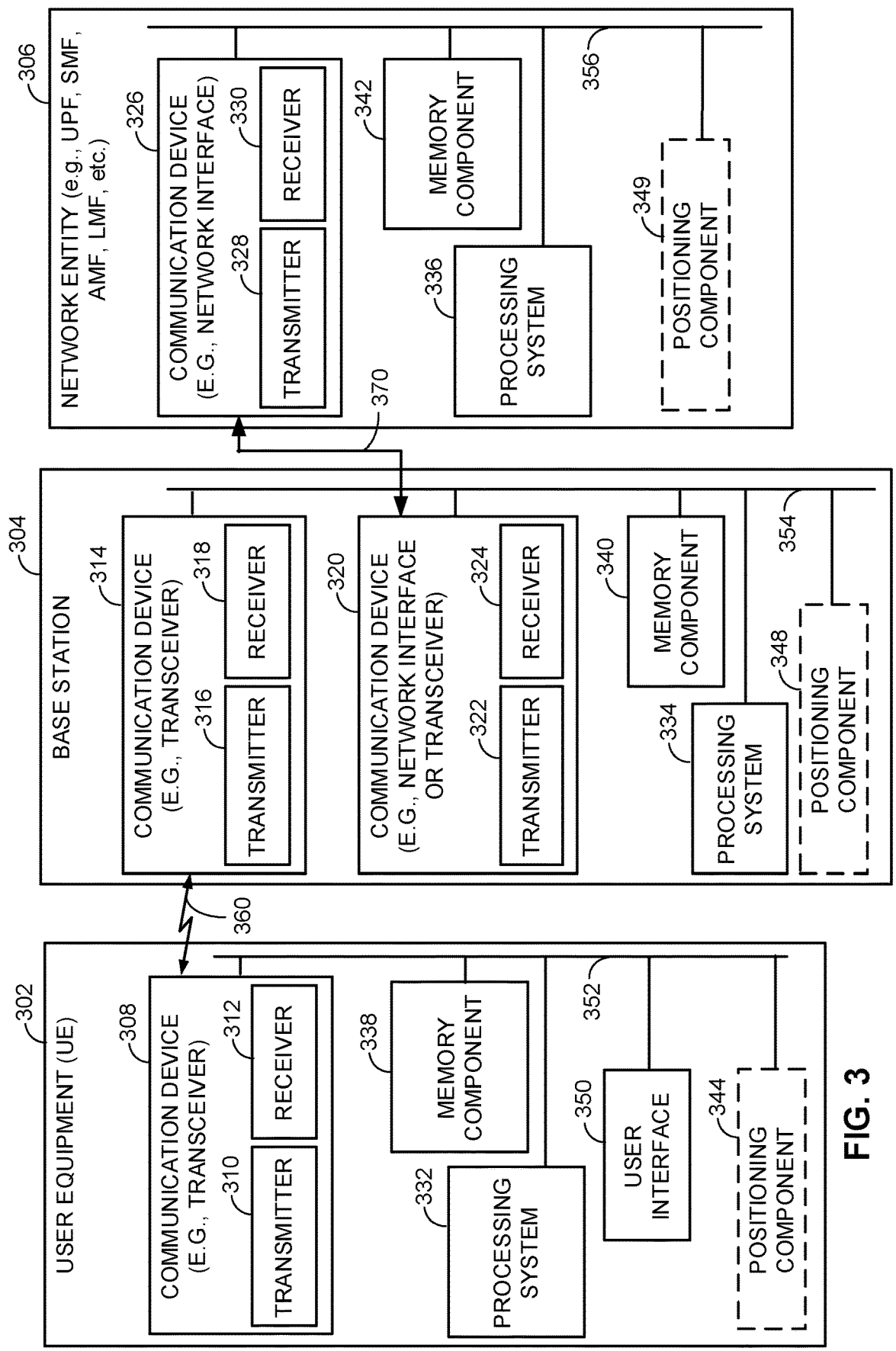
FIG. 3 is a block diagram illustrating an exemplary UE, according to various aspects.

FIG. 3 illustrates several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless communication device (represented by the communication devices 308 and 314 (and the communication device 320 if the apparatus 304 is a relay)) for communicating with other nodes via at least one designated RAT. For example, the communication devices 308 and 314 may communicate with each other over a wireless communication link 360, which may correspond to a communication link 120 in FIG. 1. Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Similarly, each communication device 314 includes at least one transmitter (represented by the transmitter 316) for transmitting signals (e.g., messages, indications, information, pilots, and so on) and at least one receiver (represented by the receiver 318) for receiving signals (e.g., messages, indications, information, and so on). If the base station 304 is a relay station, each communication device 320 may include at least one transmitter (represented by the transmitter 322) for transmitting signals (e.g., messages, indications, information, pilots, and so on) and at least one receiver (represented by the receiver 324) for receiving signals (e.g., messages, indications, information, and so on).

A transmitter and a receiver may comprise an integrated device (e.g., embodied as a transmitter circuit and a receiver circuit of a single communication device, generally referred to as a "transceiver") in some implementations, may comprise a separate transmitter device and a separate receiver device in some implementations, or may be embodied in other ways in other implementations. A wireless communication device (e.g., one of multiple wireless communication devices) of the base station 304 may also comprise a network listen module (NLM) or the like for performing various measurements.

The network entity 306 (and the base station 304 if it is not a relay station) includes at least one communication device (represented by the communication device 326 and, optionally, 320) for communicating with other nodes. For example, the communication device 326 may comprise a network interface that is configured to communicate with one or more network entities via a wire-based or wireless backhaul 370 (which may correspond to the backhaul link 122 in FIG. 1). In some aspects, the communication device 326 may be implemented as a transceiver configured to support wire-based or wireless signal communication, and the transmitter 328 and receiver 330 may be an integrated unit. This communication may involve, for example, sending and receiving: messages, parameters, or other types of information. Accordingly, in the example of FIG. 3, the communication device 326 is shown as comprising a transmitter 328 and a receiver 330. Alternatively, the transmitter 328 and receiver 330 may be separate devices within the communication device 326. Similarly, if the base station 304 is not a relay station, the communication device 320 may comprise a network interface that is configured to communicate with one or more network entities 306 via a wire-based or wireless backhaul 370. As with the communication device 326, the communication device 320 is shown as comprising a transmitter 322 and a receiver 324.

The apparatuses 302, 304, and 306 also include other components that may be used in conjunction with the file transmission operations as disclosed herein. The UE 302 includes a processing system 332 for providing functionality relating to, for example, the UE operations as described herein and for providing other processing functionality. The base station 304 includes a processing system 334 for providing functionality relating to, for example, the base station operations described herein and for providing other processing functionality. The network entity 306 includes a processing system 336 for providing functionality relating to, for example, the network function operations described herein and for providing other processing functionality. The apparatuses 302, 304, and 306 include memory components 338, 340, and 342 (e.g., each including a memory device), respectively, for maintaining information (e.g., information indicative of reserved resources, thresholds, parameters, and so on). In addition, the UE 302 includes a user interface 350 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 334 in more detail, in the downlink, IP packets from the network entity 306 may be provided to the processing system 334. The processing system 334 may implement functionality for a radio resource control (RRC) layer, a packet data convergence protocol (PDCP) layer, a radio link control (RLC) layer, and a medium access control (MAC) layer. The processing system 334 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 316 and the receiver 318 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas. The transmitter 316 may modulate an RF carrier with a respective spatial stream for transmission.

At the UE 302, the receiver 312 receives a signal through its respective antenna(s). The receiver 312 recovers information modulated onto an RF carrier and provides the information to the processing system 332. The transmitter 310 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 310 to select the appropriate coding and modulation schemes, and to facilitate spatial processing. The spatial streams generated by the transmitter 310 may be provided to different antenna(s). The transmitter 310 may modulate an RF carrier with a respective spatial stream for transmission.

The UL transmission is processed at the base station 304 in a manner similar to that described in connection with the receiver function at the UE 302. The receiver 318 receives a signal through its respective antenna(s). The receiver 318 recovers information modulated onto an RF carrier and provides the information to the processing system 334.

In the UL, the processing system 334 provides demultiplexing between transport and logical channels, packet reassembly, deciphering, header decompression, control signal processing to recover IP packets from the UE 302. IP packets from the processing system 334 may be provided to the core network. The processing system 334 is also responsible for error detection.

In an aspect, the apparatuses 302, 304 and 306 may include positioning components 344, 348 and 349, respectively. It will be appreciated the functionality of the various positioning components 344, 348 and 349 may differ based on the device where it is being implemented. The positioning components 344, 348 and 349 may be hardware circuits that are part of or coupled to the processing systems 332, 334, and 336, respectively, that, when executed, cause the apparatuses 302, 304, and 306 to perform the functionality described herein. Alternatively, the positioning components 344, 348 and 349 may be memory modules stored in the memory components 338, 340, and 342, respectively, that, when executed by the processing systems 332, 334, and 336, cause the apparatuses 302, 304, and 306 to perform the functionality described herein.

For convenience, the apparatuses 302, 304, and/or 306 are shown in FIG. 3 as including various components that may be configured according to the various examples described herein. It will be appreciated, however, that the illustrated blocks may have different functionality in different designs.

The various components of the apparatuses 302, 304, and 306 may communicate with each other over data buses 352, 354, and 356, respectively. The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, 344, and 350 may be implemented by processor and memory component(s) of the UE 302 (e.g., by execution of appropriate code and/or by appropriate configuration of processor components). Similarly, some or all of the functionality represented by blocks 314, 320, 334, 340, and 348 may be implemented by processor and memory component(s) of the base station 304 (e.g., by execution of appropriate code and/or by appropriate configuration of processor components). Also, some or all of the functionality represented by blocks 326, 336, 342, and 349 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 334, 336, the communication devices 308, 314, 326, positioning components 344, 348 and 349, etc.

Figure 4:
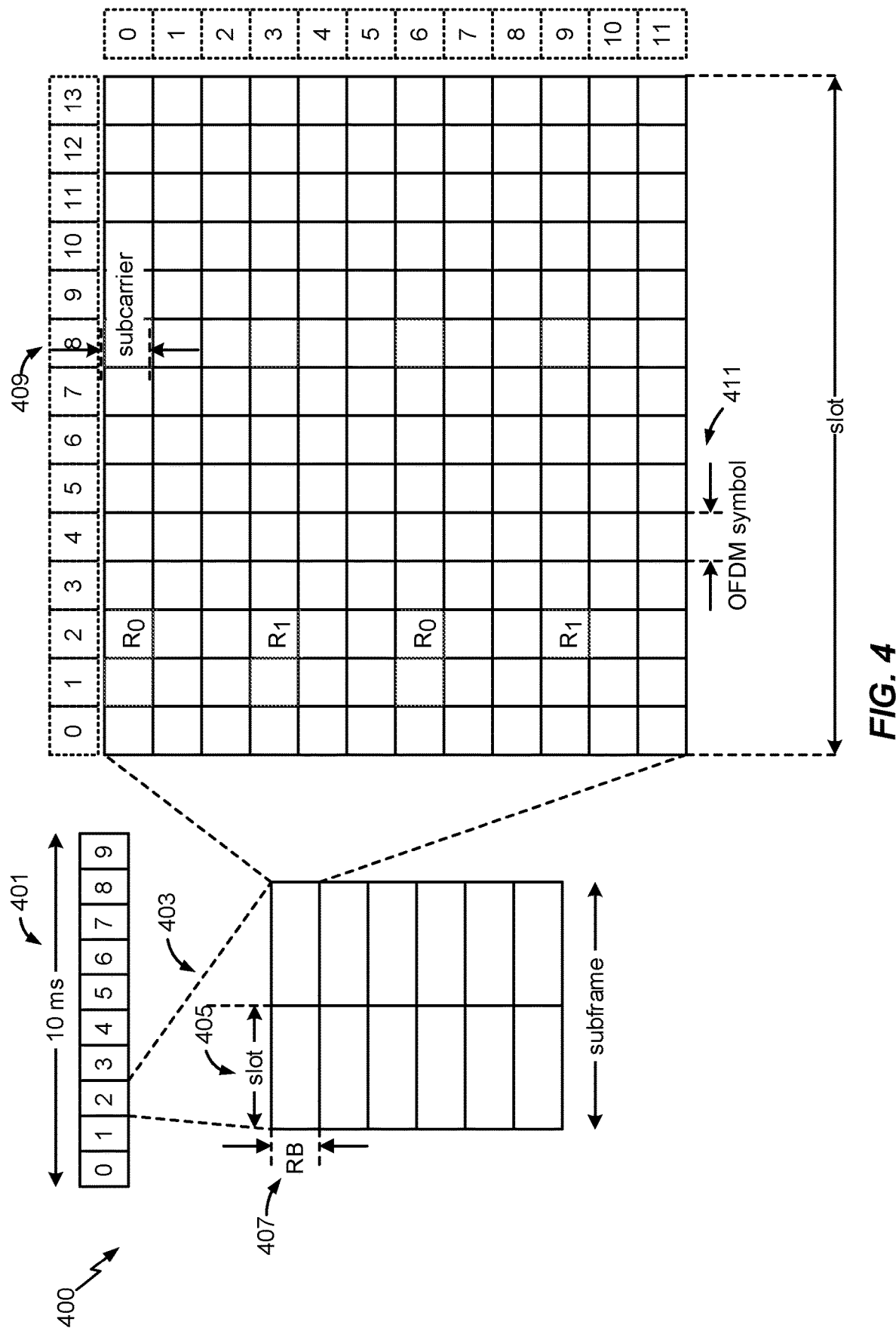
FIG. 4 is a diagram illustrating an example of a frame structure for use in a wireless telecommunications system according to an aspect of the disclosure.

Various frame structures may be used to support downlink and uplink transmissions between network nodes (e.g., base stations and UEs). FIG. 4 illustrates an example of a downlink frame structure 400 according to aspects of the disclosure. However, as those skilled in the art will readily appreciate, the frame structure for any particular application may be different depending on any number of factors. In FIG. 4, time is represented horizontally (e.g., on the X axis) with time increasing from left to right, while frequency is represented vertically (e.g., on the Y axis) with frequency increasing (or decreasing) from bottom to top. In the time domain, a frame 410 (10 ms) is divided into 10 equally sized subframes 420 (1 ms). Each subframe 420 includes two consecutive time slots 430 (0.5 ms).

A resource grid may be used to represent two time slots 430, each time slot 430 including one or more resource blocks (RBs) 440 in the frequency domain (also referred to as "physical resource blocks" or "PRBs"). In LTE, and in some cases NR, a resource block 440 contains 12 consecutive subcarriers 450 in the frequency domain and, for a normal cyclic prefix (CP) in each OFDM symbol 460, 7 consecutive OFDM symbols 460 in the time domain. A resource of one OFDM symbol length in the time domain and one subcarrier in the frequency domain (represented as a block of the resource grid) is referred to as a resource element (RE). As such, in the example of FIG. 4, there are 84 resource elements in a resource block 440.

LTE, and in some cases NR, utilize OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers 450, which are also commonly referred to as tones, bins, etc. Each subcarrier 450 may be modulated with data. In general, modulation symbols are sent in the frequency domain with OFDM and in the time domain with SC-FDM. The spacing between adjacent subcarriers 450 may be fixed, and the total number of subcarriers 450 (K) may be dependent on the system bandwidth. For example, the spacing of the subcarriers 450 may be 15 kHz and the minimum resource allocation (resource block) may be 12 subcarriers 450 (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz, 120 kHz and 204 kHz or greater may be available. Table 1 provided below lists some various parameters for different NR numerologies.

TABLE 1

| Sub-carrier spacing (kHz) | Symbols/ slot | slots/ subframe | slots/ frame | slot duration (ms) | Symbol duration (μs) | Max. nominal system BW (MHz) with 4K FFT size |
| --- | --- | --- | --- | --- | --- | --- |
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 204 | 14 | 16 | 160 | 0.0625 | 4.17 | 800 |

With continued reference to FIG. 4, some of the resource elements, indicated as $R_0$ and $R_1$, include a downlink reference signal (DL-RS). The DL-RS may include cell-specific RS (CRS) (also sometimes called common RS) and UE-specific RS (UE-RS). UE-RS are transmitted only on the resource blocks 440 upon which the corresponding physical downlink shared channel (PDSCH) is mapped. The number of bits carried by each resource element depends on the modulation scheme. Thus, the more resource blocks 440 that a UE receives and the higher the modulation scheme, the higher the data rate for the UE.

In an aspect, the DL-RS may be positioning reference signals (PRS). A base station may transmit radio frames (e.g., radio frames 410), or other physical layer signaling sequences, supporting PRS signals according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS is referred to as a "PRS resource." The collection of resource elements can span multiple PRBs in the frequency domain and N (e.g., 1 or more) consecutive symbol(s) 460 within a slot 430 in the time domain. In a given OFDM symbol 460, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A "PRS resource set" is a set of PRS resources used for the transmission of PRS signals, where each PRS resource has a PRS resource ID. In addition, the PRS resources in a PRS resource set are associated with the same transmission-reception point (TRP). A PRS resource ID in a PRS resource set is associated with a single beam transmitted from a single TRP (where a TRP may transmit one or more beams). That is, each PRS resource of a PRS resource set may be transmitted on a different beam, and as such, a "PRS resource" can also be referred to as a "beam." Note that this does not have any implications on whether the TRPs and the beams on which PRS are transmitted are known to the UE. A "PRS occasion" is one instance of a periodically repeated time window (e.g., a group of one or more consecutive slots) where PRS are expected to be transmitted. A PRS occasion may also be referred to as a "PRS positioning occasion," a "positioning occasion," or simply an "occasion."

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE or 5G, transmitter reference signals (TRS), cell-specific reference signals (CRS), channel state information reference signals (CSI-RS), primary synchronization signals (PSS), secondary synchronization signals (SSS), SSB, etc.

Figure 5:
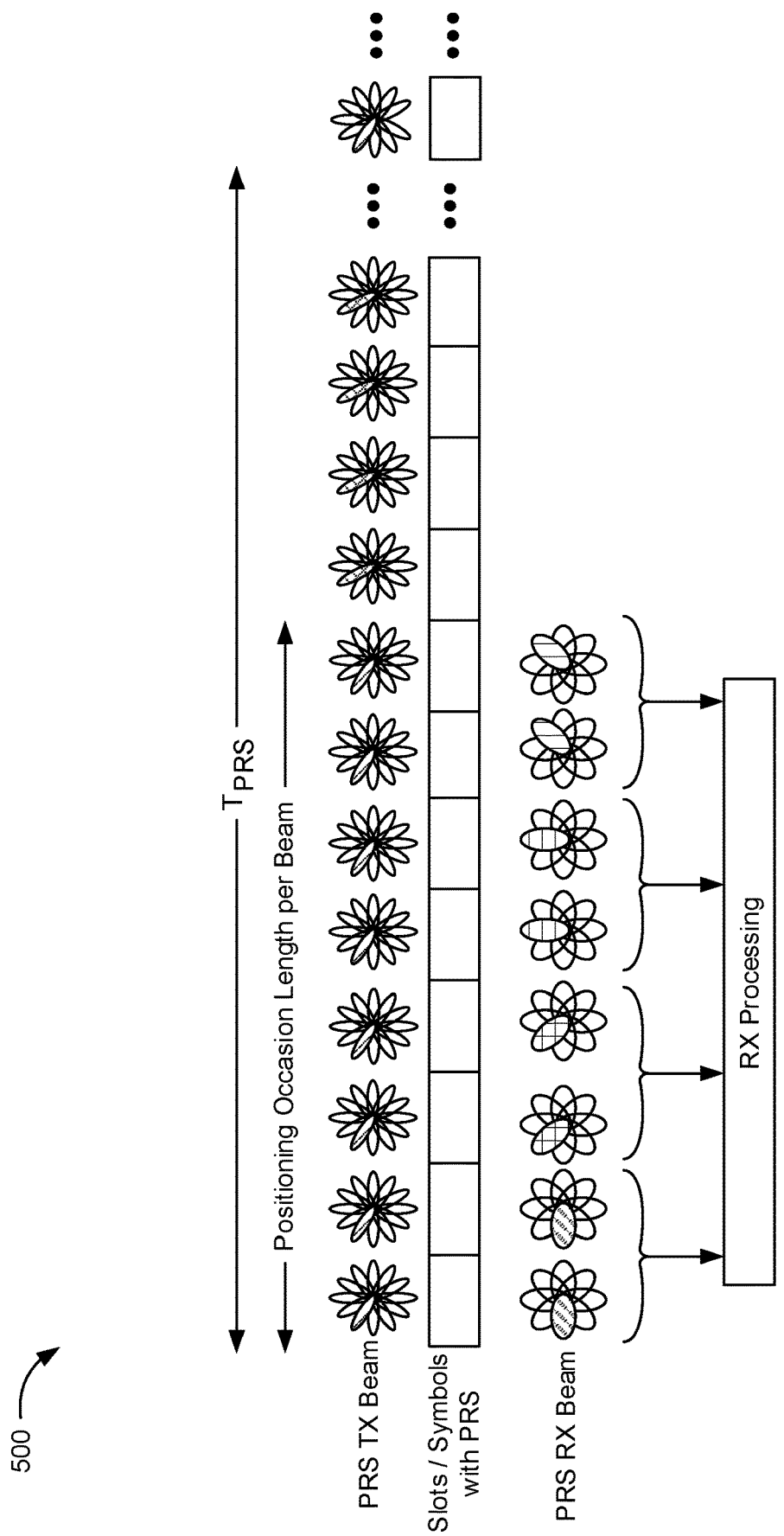
FIG. 5 is a diagram illustrating an exemplary technique for determining a position of a UE using information obtained from a plurality of base stations.

FIG. 5 illustrates exemplary DL PRSs 500 being processed through a wireless communications system according to aspects of the disclosure. In FIG. 5, a PRS transmit beams are transmitted by a cell (or transmission reception point (TRP)) over a series of beam-specific positioning occasions on respective slots/symbols during a positioning session ($T_{PRS}$). These PRS transmit beams are received as PRS receive beams at a UE, and then processed (e.g., various positioning measurements are made by the UE, etc.).

Figure 6:
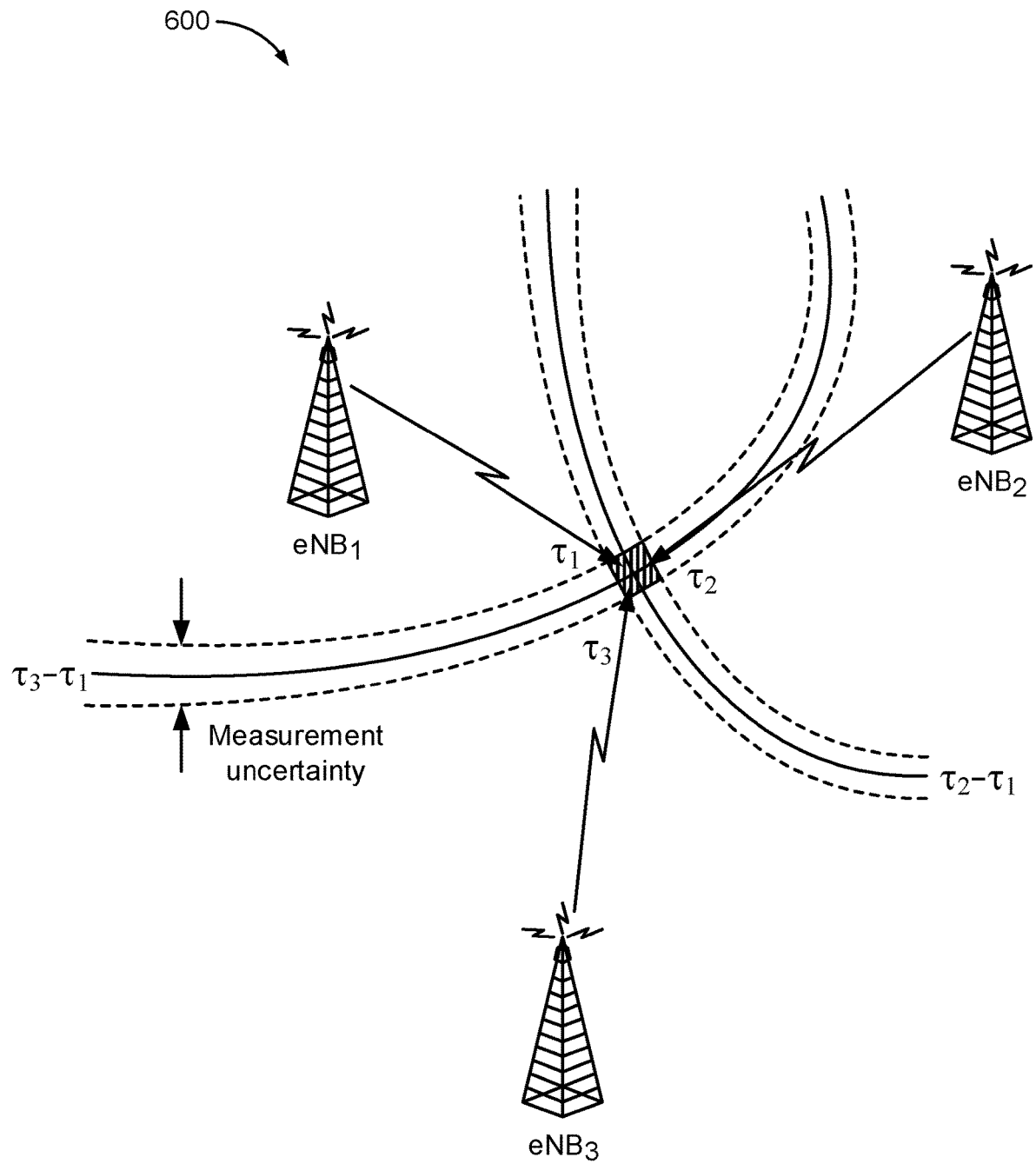
FIG. 6 is a diagram showing exemplary timings of round-trip-time (RTT) measurement signals exchanged between a base station and a UE, according to aspects of the disclosure.

FIG. 6 illustrates an exemplary wireless communications system 600 according to aspects of the disclosure. In FIG. 6, $eNB_1$, $eNB_2$ and $eNB_3$ are synchronized with each other, such that TOA (e.g., TDOA) measurements (denoted as $T_1$, $T_2$ and $T_3$) can be used to generate a positioning estimate for a UE. Multiple TDOA measurements may be used for triangulation (e.g., 4 or more cells or eNBs). In TDOA-based positioning schemes, network synchronization error is the main bottleneck in terms of positioning accuracy.

Another positioning technique that requires cell (or satellite) synchronization is based on Observed Time Difference Of Arrival (OTDOA). One example OTDOA-based positioning scheme is GPS, which is limited to an accuracy of 50-100 ns (e.g., 15-30 meters).

In NR, there is no requirement for precise timing synchronization across the network. Instead, it is sufficient to have coarse time-synchronization across gNBs (e.g., within a cyclic prefix (CP) duration of the OFDM symbols). RTT-based methods generally only need coarse timing synchronization, and as such, are a preferred positioning method in NR.

In a network-centric RTT estimation, the serving base station (e.g., base station 102) instructs the UE (e.g., UE 104) to scan for/receive RTT measurement signals (e.g., PRS) on serving cells and two or more neighboring base stations (e.g., at least three base stations are needed). The one of more base stations transmit RTT measurement signals on low reuse resources (e.g., resources used by the base station to transmit system information) allocated by the network (e.g., location server 230, LMF 270). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS, UL-PRS) to the one or more base stations (e.g., when instructed by its serving base station) and may include the difference $T_{Rx \to Tx}$ (e.g., $T_{Rx \to Tx}$ 912 in FIG. 9) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ (e.g., $T_{Tx \to Rx}$ 922 in FIG. 9) between the transmission time of the RTT measurement signal and the ToA of the RTT response to the UE-reported difference $T_{Rx \to Tx}$ (e.g., $T_{Rx \to Tx}$ 912 in FIG. 9), the base station can deduce the propagation time between the base station and the UE, from which it can then determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

Figure 7:
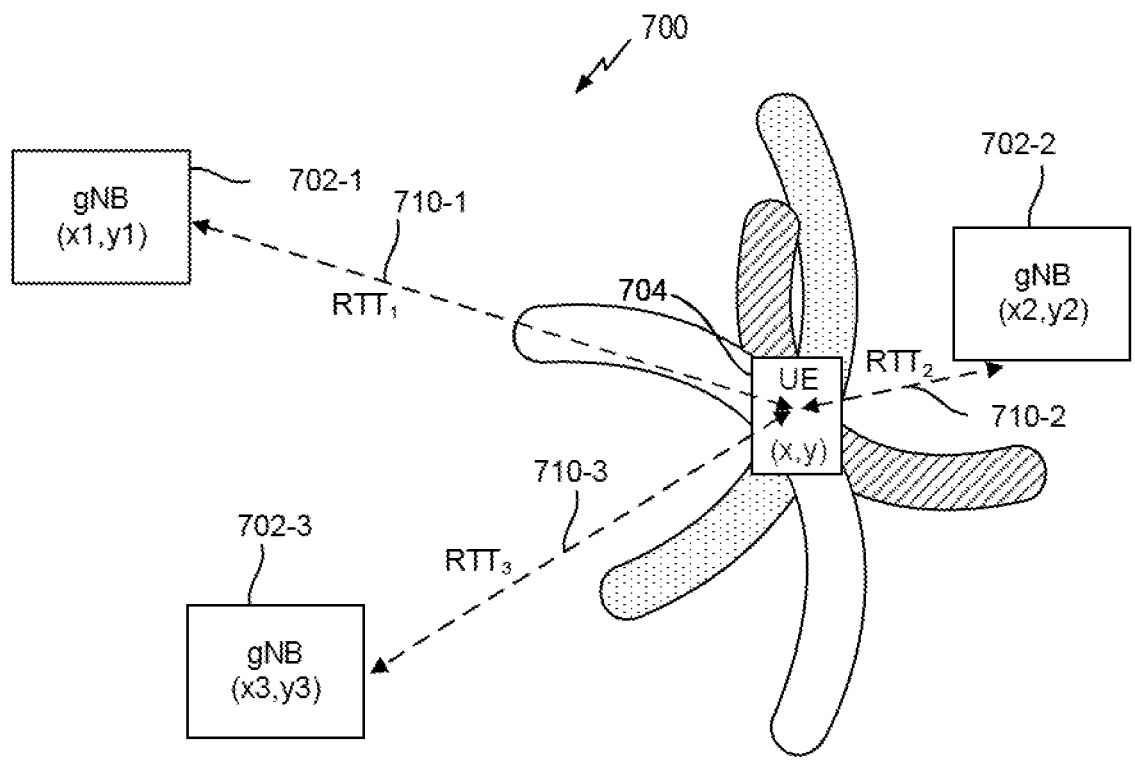
FIG. 7 illustrates an exemplary wireless communications system according to aspects of the disclosure.

FIG. 7 illustrates an exemplary wireless communications system 700 according to aspects of the disclosure. In the example of FIG. 7, a UE 704 (which may correspond to any of the UEs described herein) is attempting to calculate an estimate of its position, or assist another entity (e.g., a base station or core network component, another UE, a location server, a third party application, etc.) to calculate an estimate of its position. The UE 704 may communicate wirelessly with a plurality of base stations 702-1, 702-2, and 702-3 (collectively, base stations 702, and which may correspond to any of the base stations described herein) using RF signals and standardized protocols for the modulation of the RF signals and the exchange of information packets. By extracting different types of information from the exchanged RF signals, and utilizing the layout of the wireless communications system 700 (i.e., the base stations' locations, geometry, etc.), the UE 704 may determine its position, or assist in the determination of its position, in a predefined reference coordinate system. In an aspect, the UE 704 may specify its position using a two-dimensional coordinate system; however, the aspects disclosed herein are not so limited, and may also be applicable to determining positions using a three-dimensional coordinate system, if the extra dimension is desired. Additionally, while FIG. 7 illustrates one UE 704 and three base stations 702, as will be appreciated, there may be more UEs 704 and more base stations 702.

To support position estimates, the base stations 702 may be configured to broadcast reference RF signals (e.g., PRS, NRS, CRS, TRS, CSI-RS, PSS, SSS, etc.) to UEs 704 in their coverage area to enable a UE 704 to measure characteristics of such reference RF signals. For example, the UE 704 may measure the ToA of specific reference RF signals (e.g., PRS, NRS, CRS, CSI-RS, etc.) transmitted by at least three different base stations 702 and may use the RTT positioning method to report these ToAs (and additional information) back to the serving base station 702 or another positioning entity (e.g., location server 230, LMF 270).

In an aspect, although described as the UE 704 measuring reference RF signals from a base station 702, the UE 704 may measure reference RF signals from one of multiple cells supported by a base station 702. Where the UE 704 measures reference RF signals transmitted by a cell supported by a base station 702, the at least two other reference RF signals measured by the UE 704 to perform the RTT procedure would be from cells supported by base stations 702 different from the first base station 702 and may have good or poor signal strength at the UE 704.

In order to determine the position (x, y) of the UE 704, the entity determining the position of the UE 704 needs to know the locations of the base stations 702, which may be represented in a reference coordinate system as $(x_k, y_k)$, where k=1, 2, 3 in the example of FIG. 7. Where one of the base stations 702 (e.g., the serving base station) or the UE 704 determines the position of the UE 704, the locations of the involved base stations 702 may be provided to the serving base station 702 or the UE 704 by a location server with knowledge of the network geometry (e.g., location server 230, LMF 270). Alternatively, the location server may determine the position of the UE 704 using the known network geometry.

Either the UE 704 or the respective base station 702 may determine the distance ($d_k$, where k=1, 2, 3) between the UE 704 and the respective base station 702. In an aspect, determining the RTT 710 of signals exchanged between the UE 704 and any base station 702 can be performed and converted to a distance ($d_k$). As discussed further below, RTT techniques can measure the time between sending a signaling message (e.g., reference RF signals) and receiving a response. These methods may utilize calibration to remove any processing delays. In some environments, it may be assumed that the processing delays for the UE 704 and the base stations 702 are the same. However, such an assumption may not be true in practice.

Once each distance $d_k$ is determined, the UE 704, a base station 702, or the location server (e.g., location server 230, LMF 270) can solve for the position (x, y) of the UE 704 by using a variety of known geometric techniques, such as, for example, trilateration. From FIG. 7, it can be seen that the position of the UE 704 ideally lies at the common intersection of three semicircles, each semicircle being defined by radius $d_k$ and center $(x_k, y_k)$, where k=1, 2, 3.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE 704 from the location of a base station 702). The intersection of the two directions at or near the point (x, y) can provide another estimate of the location for the UE 704.

A position estimate (e.g., for a UE 704) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 8:
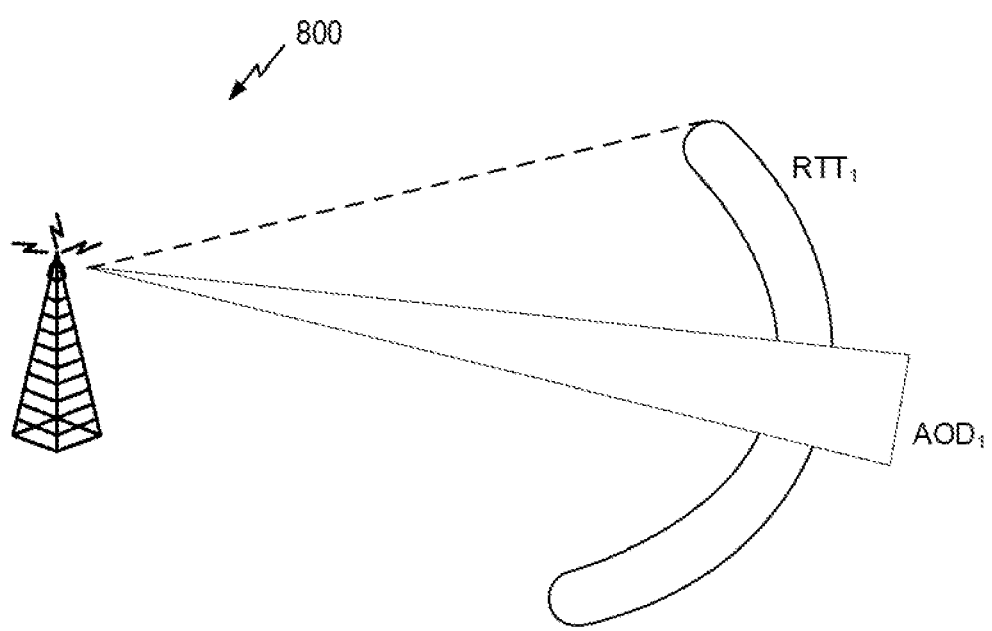
FIG. 8 illustrates an exemplary wireless communications system according to aspects of the disclosure.

FIG. 8 illustrates an exemplary wireless communications system 800 according to aspects of the disclosure. While FIG. 7 depicts an example of a multi-cell RTT positioning scheme, FIG. 8 depicts an example of a single-cell RTT positioning scheme. In FIG. 8, $RTT_1$ is measured along with an $AoD_1$ associated with a beam on which a DL PRS is transmitted from a cell to a UE. The overlapping region of the $RTT_1$ and $AoD_1$ depicted in FIG. 9 provides a coarse location estimate for the associated UE.

Figure 9:
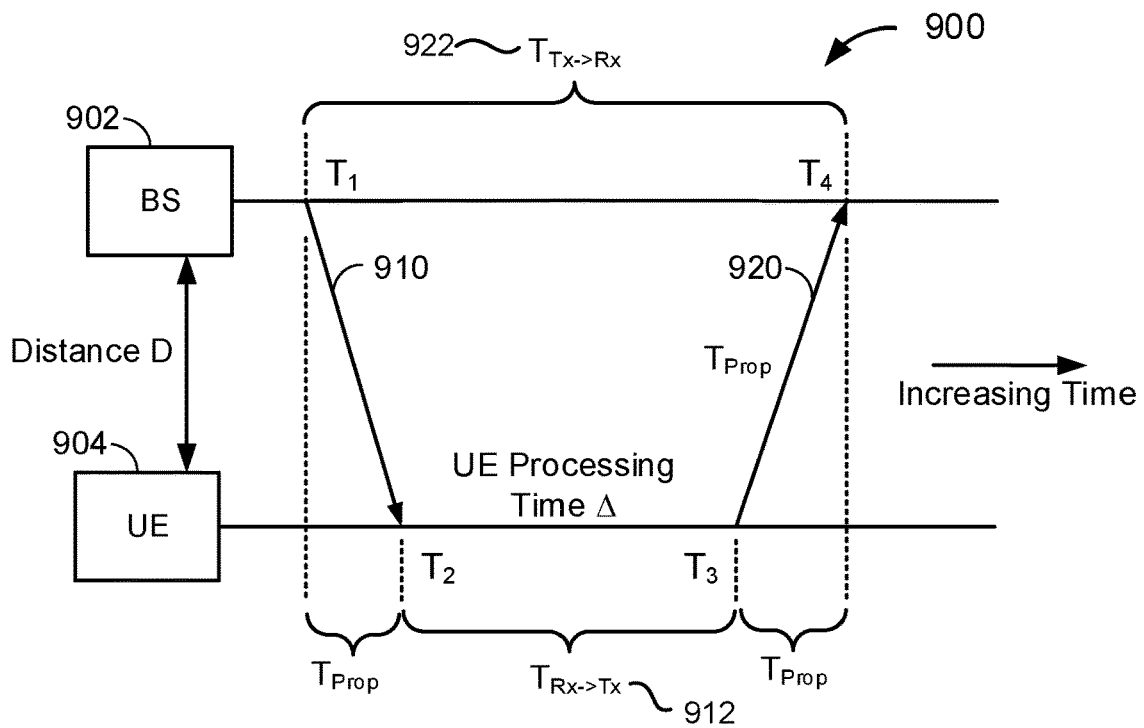
FIG. 9 is a diagram showing exemplary timings of RTT measurement signals exchanged between a base station and a UE according to aspects of the disclosure.

FIG. 9 is a diagram 900 showing exemplary timings of RTT measurement signals exchanged between a base station 902 (e.g., any of the base stations described herein) and a UE 904 (e.g., any of the UEs described herein), according to aspects of the disclosure. In the example of FIG. 9, the base station 902 sends an RTT measurement signal 910 (e.g., PRS, NRS, CRS, CSI-RS, etc.) to the UE 904 at time $T_1$. The RTT measurement signal 910 has some propagation delay $T_{Prop}$ as it travels from the base station 902 to the UE 904. At time $T_2$ (the ToA of the RTT measurement signal 910 at the UE 904), the UE 904 receives/measures the RTT measurement signal 910. After some UE processing time, the UE 904 transmits an RTT response signal 920 at time $T_3$. After the propagation delay $T_{Prop}$, the base station 902 receives/measures the RTT response signal 920 from the UE 904 at time $T_4$ (the ToA of the RTT response signal 920 at the base station 902).

In order to identify the ToA (e.g., $T_2$) of a reference signal (e.g., an RTT measurement signal 910) transmitted by a given network node (e.g., base station 902), the receiver (e.g., UE 904) first jointly processes all the resource elements (REs) on the channel on which the transmitter is transmitting the reference signal, and performs an inverse Fourier transform to convert the received reference signals to the time domain. The conversion of the received reference signals to the time domain is referred to as estimation of the channel energy response (CER). The CER shows the peaks on the channel over time, and the earliest "significant" peak should therefore correspond to the ToA of the reference signal. Generally, the receiver will use a noise-related quality threshold to filter out spurious local peaks, thereby presumably correctly identifying significant peaks on the channel. For example, the receiver may chose a ToA estimate that is the earliest local maximum of the CER that is at least X dB higher than the median of the CER and a maximum Y dB lower than the main peak on the channel. The receiver determines the CER for each reference signal from each transmitter in order to determine the ToA of each reference signal from the different transmitters.

In some designs, the RTT response signal 920 may explicitly include the difference between time $T_3$ and time $T_2$ (i.e., $T_{Rx \to Tx}$ 912). Using this measurement and the difference between time $T_4$ and time $T_1$ (i.e., $T_{Tx \to Rx}$ 922), the base station 902 (or other positioning entity, such as location server 230, LMF 270) can calculate the distance to the UE 904 as:

$$d = \frac{1}{2c}(T_{Tx \to Rx} - T_{Rx \to Tx}) = \frac{1}{2c}(T_2 - T_1) - \frac{1}{2c}(T_4 - T_3)$$

where c is the speed of light.

Figure 10:
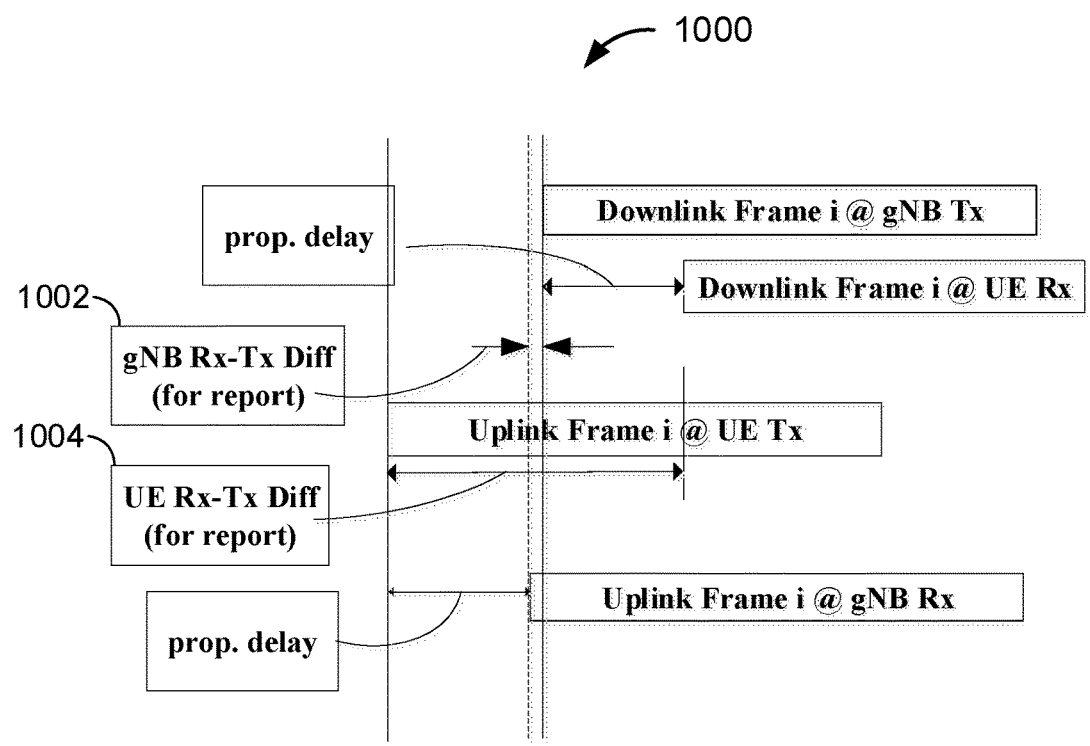
FIG. 10 illustrates is a diagram showing exemplary timings of RTT measurement signals exchanged between a base station (e.g., any of the base stations described herein) and a UE (e.g., any of the UEs described herein), according to other aspects of the disclosure.

FIG. 10 illustrates is a diagram 1000 showing exemplary timings of RTT measurement signals exchanged between a base station (e.g., any of the base stations described herein) and a UE (e.g., any of the UEs described herein), according to other aspects of the disclosure. In particular, 1002-1004 of FIG. 10 denote portions of frame delay that are associated with a Rx-Tx differences as measured at the gNB and UE, respectively.

Figure 11:
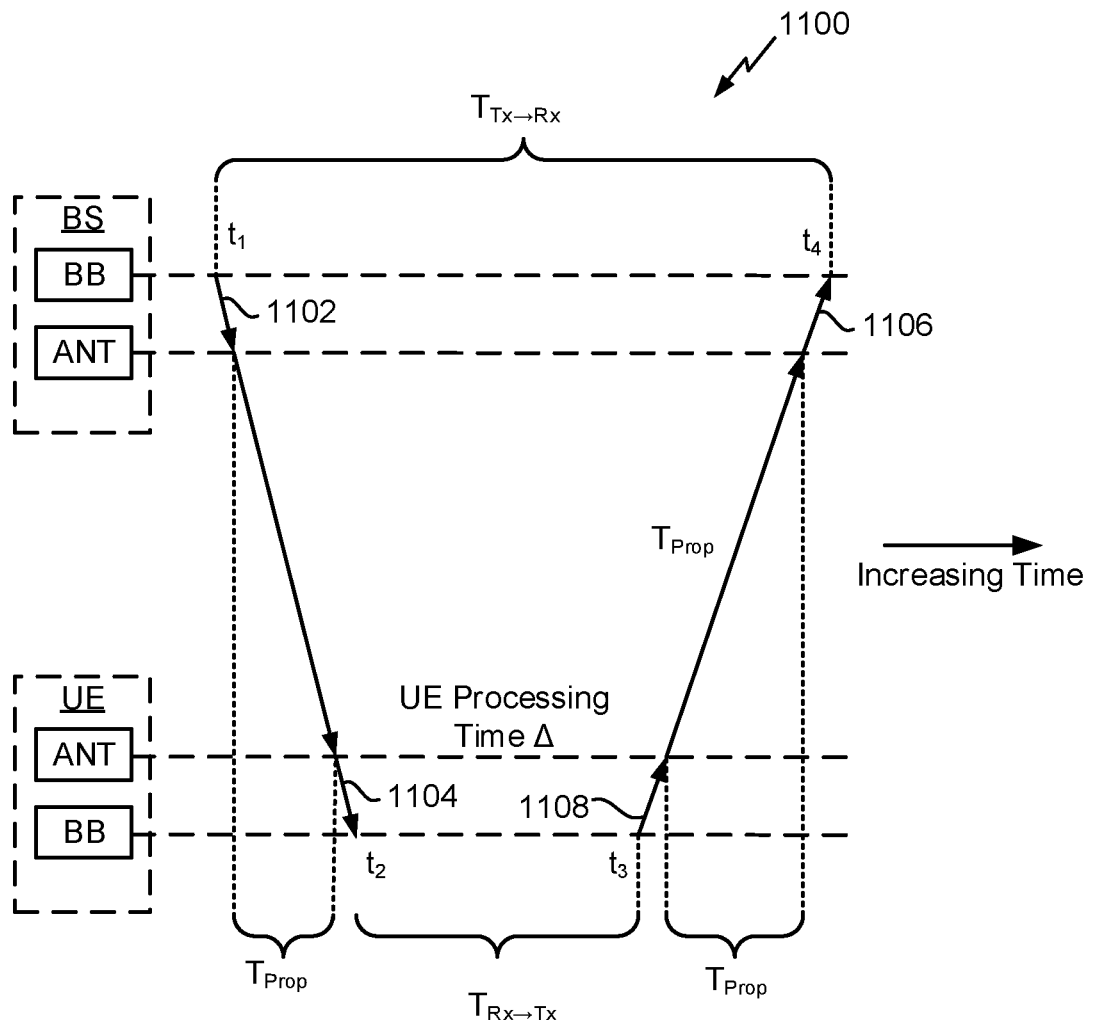
FIG. 11 illustrates a diagram showing exemplary timings of RTT measurement signals exchanged between a base station (gNB) (e.g., any of the base stations described herein) and a UE (e.g., any of the UEs described herein), according to aspects of the disclosure.

An additional source of delay or error is due to UE and gNB hardware group delay for position location. FIG. 11 illustrates a diagram 1100 showing exemplary timings of RTT measurement signals exchanged between a base station (gNB) (e.g., any of the base stations described herein) and a UE (e.g., any of the UEs described herein), according to aspects of the disclosure. FIG. 11 is similar in some respects to FIG. 9. However, in FIG. 11, the UE and gNB hardware group delay (which is primarily due to internal hardware delays between a baseband (BB) component and antenna at the UE and gNB) is shown with respect 1102-1108 (denoted as ΔRx and ΔTx). As will be appreciated, both Tx-side and Rx-side path-specific or beam-specific delays impact the RTT measurement.

Figure 12:
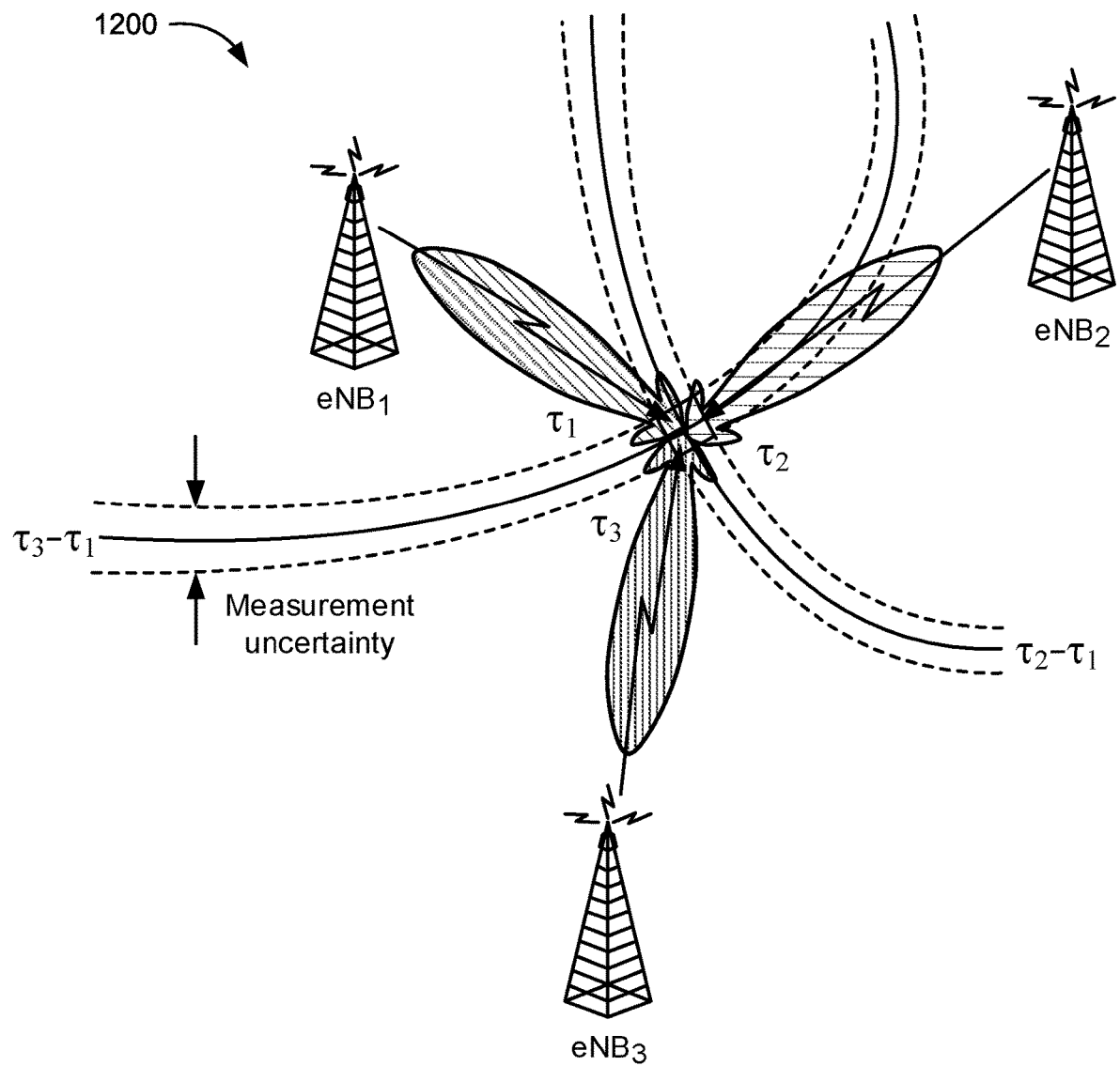
FIG. 12 illustrates an exemplary wireless communications system according to aspects of the disclosure.

FIG. 12 illustrates an exemplary wireless communications system 1200 according to aspects of the disclosure. The wireless communications system 1200 is similar to the wireless communications system 600 of FIG. 6. However, the wireless communications system 1200 further depicts the beams associated with the respective TOA (e.g., TDOA) measurements (denoted as $T_1$, $T_2$ and $T_3$). As will be appreciated, Rx-side path-specific or beam-specific delays impact the DL TDOA measurement. While not shown explicitly, Tx-side path-specific or beam-specific delays impact UL TDOA measurements in a similar manner.

The precision of positioning estimates at the UE is on UE-side is limited by how finely group-delay/timing errors can be maintained. For example, 1 ns error for ΔRx and ΔTx can lead to an approximate 2 foot limit on precision. Some 3GPP standards are targeting as a positioning precision of less than 3 m (for Rel-16) and less than 1 m (for general commercial for Rel-17). Knowledge of UE and/or gNB hardware group delay may thereby help to improve location accuracy.

As an example, in RTT-based positioning, RTT can be estimated between a UE and two gNBs. The positioning estimate for the UE can then be narrowed to the intersection of a geographic range that maps to these two RTTs (e.g., to a hyperbola). RTTs to additional gNBs (or to particular TRPs of such gNBs) can further narrow (or refine) the positioning estimate for the UE. Differential RTT is a positioning scheme whereby a difference between two RTT measurements (or measurement ranges) is used to generate a positioning estimate for a UE.

In some designs, a positioning engine (e.g., at the UE, base station, or server/LMF) can select between whether RTT measurements are to be used to compute a positioning estimate using typical RTT or differential RTT. For example, if the positioning engine receives RTTs that are known to have already accounted for hardware group delays, then typical RTT positioning is performed (e.g., as shown in FIGS. 6-7). Otherwise, in some designs, differential RTT is performed so that some of the hardware group delay can be canceled out. In some designs where the positioning engine is implemented at the network-side (e.g., gNB/LMU/eS-MLC/LMF), the group hardware delay at the UE is not known (and vice versa).

An example of theoretical Rx–Tx delay measurements between a UE and base stations 1 and 2, respectively, is as follows:

$$\tilde{T}_{Rx\text{-}Tx}^{(1)} = T_{Rx\text{-}Tx}^{(1)} + w \qquad \text{Equation 1}$$

$$\tilde{T}_{Rx\text{-}Tx}^{(2)} = T_{Rx\text{-}Tx}^{(2)} + w \qquad \text{Equation 2}$$

whereby w denotes the hardware group delay.

As will be appreciated, if the hardware group delay w is the same for both $\tilde{T}_{Rx\text{-}Tx}^{(1)}$ and $\tilde{T}_{Rx\text{-}Tx}^{(2)}$, then the hardware group delay w cancels out completely when a differential is taken between $\tilde{T}_{Rx\text{-}Tx}^{(1)}$ and $\tilde{T}_{Rx\text{-}Tx}^{(2)}$. One problem that may occur is that the hardware group delay w does not actually remain constant, but rather changes over time, as follows:

$$\tilde{T}_{Rx\text{-}Tx}^{(1)} = T_{Rx\text{-}Tx}^{(1)} + w(t_1) \qquad \text{Equation 3}$$

$$\tilde{T}_{Rx\text{-}Tx}^{(2)} = T_{Rx\text{-}Tx}^{(2)} + w(t_2) \qquad \text{Equation 4}$$

whereby $w(t_1)$ and $w(t_2)$ reflect the at times $t_1$ and $t_2$, respectively.

In this case, a residual error is present due to the differential between $w(t_1)$ and $w(t_2)$ when a differential is taken between $\tilde{T}_{Rx\text{-}Tx}^{(1)}$ and $\tilde{T}_{Rx\text{-}Tx}^{(2)}$. This residual error is due to a phenomenon referred to herein as time drift. As an example, time drift in a hardware group delay can occur due to various environmental factors, such as humidity, temperature, and so on.

Another problem with differential RTT may occur where the UE-side hardware group delay (e.g., 912 in FIG. 9, 1104-1108 in FIG. 11) is effectively canceled out along with a reference gNB hardware group delay, but a residual gNB hardware group delay persists. For example, a residual gNB hardware group delay for gNB i may be denoted as $GD_{diff,gNB,i}$, e.g.:

$$GD_{diff,gNB,i} = GD_{gNB,i} - GD_{gNB\_ref} \qquad \text{Equation 5}$$

whereby $GD_{gNB,i}$ is the hardware group delay for gNB i (e.g., 1102 or 1106 of FIG. 11) and $GD_{gNB\_ref}$ is the hardware group delay for the reference gNB. $GD_{gNB\_ref}$ is common across all RTTs associated with the differential RTT positioning procedure.

While described above with respect to a reference gNB, in other designs, any wireless communications device associated with a known location (e.g., a reference UE with a recent positioning fix, etc.) may be used as a reference device in various positioning schemes (e.g., RTT, differential RTT, double differential RTT, TDOA, etc.). In some systems, the reference device (e.g., gNB or reference UE) is selected based on signal quality criteria such as RSRP. However, a reference device (e.g., gNB or reference UE) with good signal quality is not necessarily the best choice in terms of hardware group delay calibration. Aspects of the disclosure are thereby directed to reference device (e.g., gNB or reference UE) selection based at least in part upon hardware group delay calibration capabilities associated with the reference devices (e.g., gNBs and/or reference UEs) associated with a positioning procedure (e.g., RTT, differential RTT, double differential RTT, TDOA, etc.) for a UE. Such aspects may provide various technical advantages, including improved positioning estimate precision for UEs.

Figure 13:
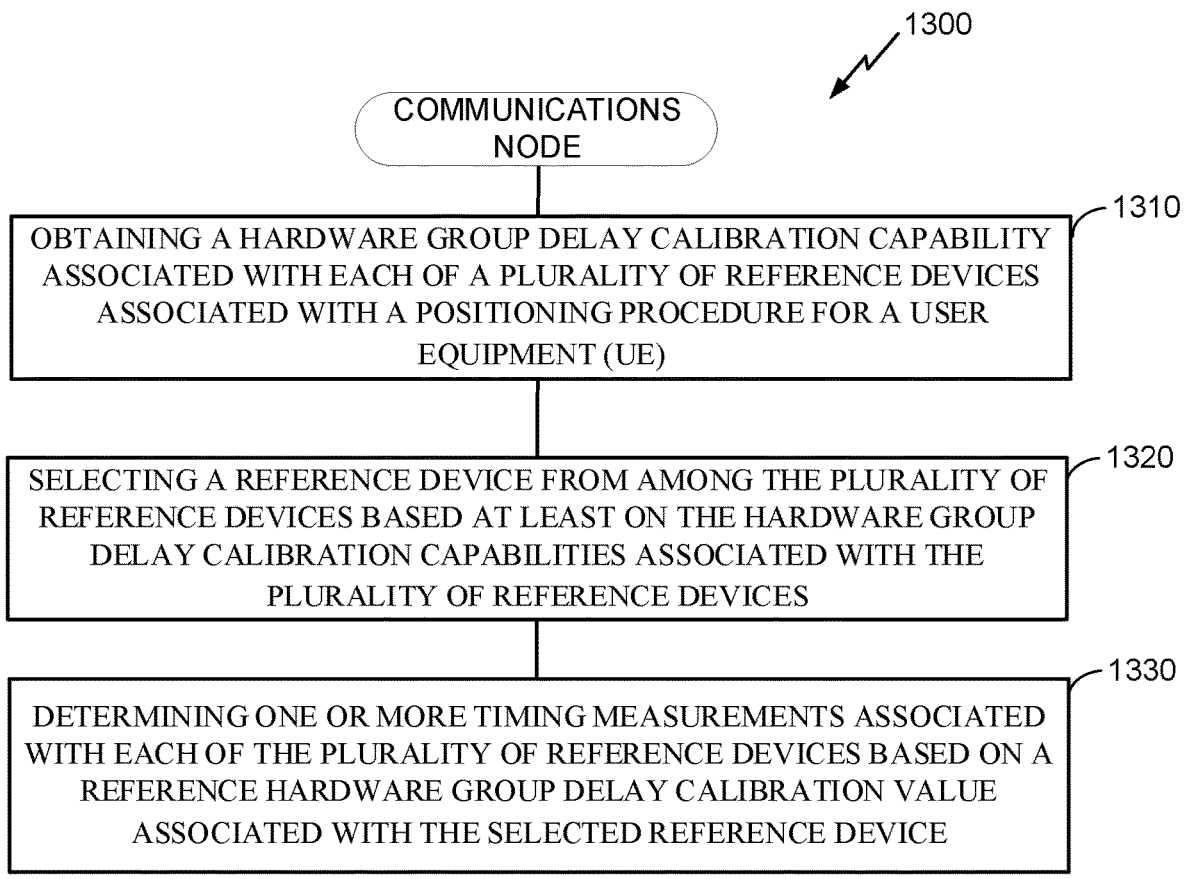
FIG. 13 illustrates an exemplary method of wireless communication, according to aspects of the disclosure.

FIG. 13 illustrates an exemplary process 1300 of wireless communication, according to aspects of the disclosure. The process 1300 may be performed by a communications node. In some designs, the communications node that performs the process 1300 is a UE (e.g., any of the UEs described herein, such as UE 302). In other designs, the communications node that performs the process 1300 is a BS (e.g., any of the BSs or gNBs described herein, such as BS 304, which may comprise an integrated LMF). In other designs, the communications node that performs the process 1300 is a network entity, such as network entity 306 (e.g., LMF). Moreover, while the process 1300 is described in some aspects with respect to RTT (e.g., differential RTT), in some designs the process 1300 of FIG. 13 may also be applicable to other types of RTT (e.g., double differential RTT, where a first differential RTT is measured between a target UE and two reference nodes and a second differential RTT is measured between a reference device and the two reference nodes) or non-RTT positioning techniques such as DL or UL TDOA.

At 1310, the communications node (e.g., receiver 312, receiver 318, receiver 324, receiver 330, processing system 334, memory component 340, etc.) obtains a hardware group delay calibration capability associated with each of a plurality of reference devices (e.g., gNBs and/or reference UEs) associated with a positioning procedure for a UE. In an example, the communications node may correspond to the UE, and the positioning procedure (e.g., traditional RTT, differential RTT, double differential RTT, TDOA, etc.) is a UE-based positioning procedure. In another example, the communications node may correspond to a network device (e.g., gNB, LMF, etc.), and the positioning procedure (e.g., traditional RTT, differential RTT, double differential RTT, TDOA, etc.) is a network-based positioning procedure.

At 1320, the communications node (e.g., processing system 332, processing system 334, processing system 336, etc.) selects a reference device (e.g., gNB or reference UE) from among the plurality of reference devices based at least on the hardware group delay calibration capabilities associated with the plurality of reference devices. For example, assume that each reference device (e.g., gNB or reference UE) reports its hardware group delay calibration capability as a respective hardware group delay error range of [−T1, +T1] ns. In some designs, the communications node at 1320 may select, as the selected reference device (e.g., gNB or reference UE), the reference device (e.g., gNB or reference UE) for the positioning procedure (e.g., traditional RTT, differential RTT, double differential RTT, TDOA, etc.) as the reference device associated with the narrowest hardware group delay error range (e.g., or smallest value of T1). In some designs, the selection of 1320 may select the reference device based on the hardware group delay calibration capabilities associated with the plurality of reference devices and at least one secondary criteria. For example, the at least one secondary criteria may comprise RSRP measurements between the plurality of reference devices and the UE (e.g., a higher RSRP measurement may weight a respective reference device more favorably in terms of reference device selection).

At 1330, the communications node (e.g., processing system 332, processing system 334, processing system 336, components 344/348/349, etc.) determines (e.g., calibrates) one or more timing (e.g., positioning) measurements associated with each of the plurality of reference devices based on a reference hardware group delay calibration value ($GD_{gNB\_ref}$) associated with the selected reference device (e.g., as in Equation 5, above).

Referring to FIG. 13, in some designs, the communications node may transmit a hardware group delay calibration capability request to each of the plurality of reference devices, wherein the obtaining comprises receiving the hardware group delay calibration capability for each of the plurality of reference devices in response to the request. In an example, for UE-based positioning, the UE may transmit the requests to the reference devices (e.g., BSs and/or reference UEs), which then report their hardware group delay calibration capabilities to the LMF, which in turn propagates this information back to the UE. In other designs, for network-based positioning, the LMF may transmit the requests to the reference devices (e.g., BSs and/or reference UEs), which then report their hardware group delay calibration capabilities to the LMF.

Referring to FIG. 13, in some designs, the hardware group delay calibration capability for at least one of the plurality of reference devices (e.g., BSs and/or reference UEs) is specific to a particular set of frequency-domain resources, a particular set of beams, a particular transmission reception point (TRP). For example, in some designs, each reference device (e.g., gNB or UE) may report its respective hardware group delay calibration capability (or calibration error) with an indication of an associated timestamp, band, positioning frequency layer, UE ID, and/or TRP ID. In some designs, the hardware group delay calibration capability (or calibration error) may be different for different bands. In some designs, certain parameters may be grouped or common with respect to a positioning frequency layer (e.g., the center frequency), in which case the hardware group delay calibration capability (or calibration error) may be specific to a positioning frequency layer. In some designs, different beams may be associated with a different hardware group delay calibration capability (or calibration error), e.g., UE/TRP may have multiple antenna panels, in which case the hardware group delay calibration capability (or calibration error) may be specific to a particular UE ID or TRP.

Referring to FIG. 13, in some designs, the hardware group delay calibration capability for at least one of the plurality of reference devices (e.g., BSs and/or reference UEs) is time-varying. In this case, at block 1310, the communications node may obtain at least one parameter (e.g., a timestamp, etc.) for modeling a time-varying function of the hardware group delay calibration capability of the at least one reference device (e.g., BS or reference UE).

Referring to FIG. 13, in some designs, at block 1310, the communications node may receive differential hardware group delay calibration capability information that is relative to previously received hardware group delay calibration capability information. For example, if the hardware group delay calibration capability of particular reference devices (e.g., BSs and/or reference UEs) changes infrequently, then differential reporting can be used to reduce report overhead.

As noted above with respect to Equation 5, in a gNB-specific example, the residual gNB hardware group delay ($GD_{diff,gNB,i}$) is a factor that can reduce precision of UE positioning. Aspects of the disclosure are thereby directed to estimation of the residual reference device (e.g., gNB or reference UE) hardware group delay (e.g., in a gNB-specific example, $GD_{diff,gNB,i}$) so that the residual reference device hardware group delay (e.g., in a gNB-specific example, $GD_{diff,gNB,i}$) can be canceled out during a position estimation procedure for a UE. Such aspects may provide various technical advantages, including improved positioning estimate precision for UEs.

Figure 14:
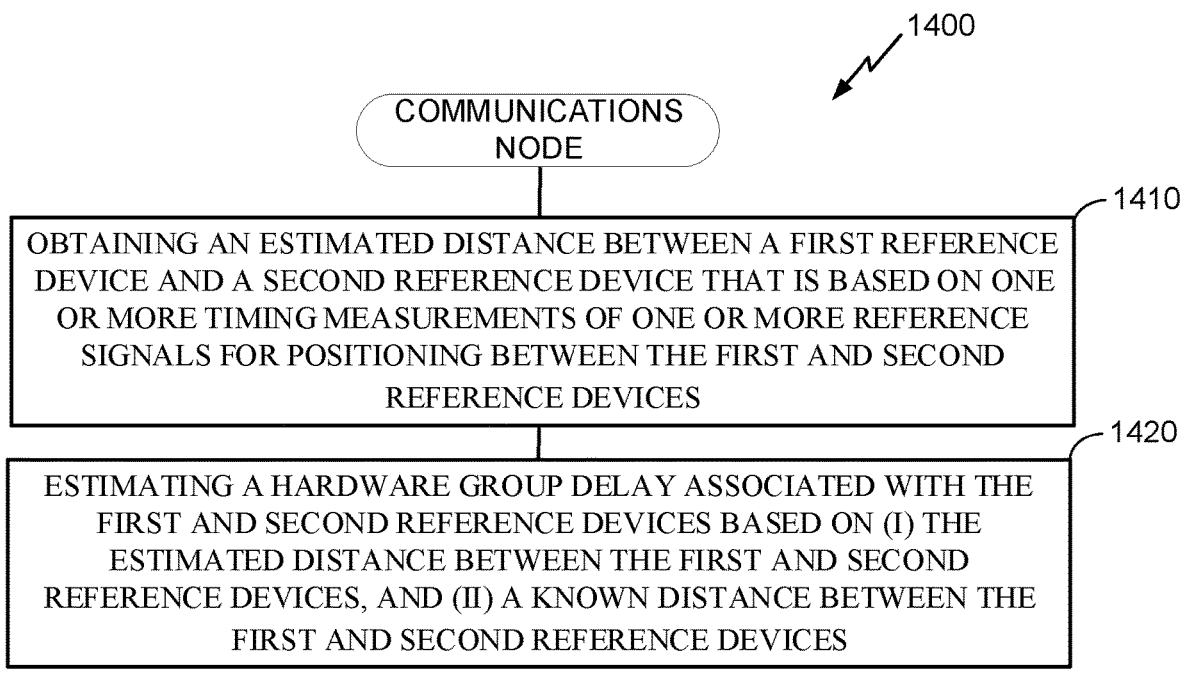
FIG. 14 illustrates an exemplary method of wireless communication, according to aspects of the disclosure.

FIG. 14 illustrates an exemplary process 1400 of wireless communication, according to aspects of the disclosure. The process 1400 may be performed by a communications node. In some designs, the communications node that performs the process 1400 a BS (e.g., any of the BSs or gNBs described herein, such as BS 304, which may comprise an integrated LMF). In other designs, the communications node that performs the process 1400 is a network entity, such as network entity 306 (e.g., LMF). Moreover, while the process 1400 is described in some aspects with respect to RTT (e.g., differential RTT), in some designs the process 1400 of FIG. 14 may also be applicable to other types of RTT (e.g., double differential RTT, where a first differential RTT is measured between a target UE and two reference nodes and a second differential RTT is measured between a reference device and the two reference nodes) or non-RTT positioning techniques such as DL or UL TDOA.

At 1410, the communications node (e.g., receiver 318, receiver 324, positioning component 348 or 349, receiver 330, etc.) obtains an estimated distance between a first reference device (e.g., gNB or reference UE) and a second reference device (e.g., gNB or reference UE) that is based on one or more timing measurements of one or more reference signals for positioning between the first and second reference devices. In some designs, one or more timing measurements may be associated with an RTT measurement (e.g., traditional RTT, differential RTT, double differential RTT, etc.), similar to FIG. 9 or FIG. 11 except that the reference signals for positioning are exchanged between two reference devices (e.g., BSs or gNBs or reference UEs) instead of between a UE and a BS. In other designs, the one or more timing measurements may be associated with a UL or DL TDOA measurement. In some designs, the one or more reference signals may be configured similarly to PRSs, although this is optional. In some designs, the one or more reference signals for positioning may correspond to OTA signals with a direct LOS between the first and second reference devices (e.g., gNBs and/or reference UEs).

At 1420, the communications node (e.g., processing system 334 or 336, positioning component 348 or 349, etc.) estimates a hardware group delay associated with the first and second reference devices based on (i) the estimated distance between the first and second reference devices, and (ii) a known distance between the first and second reference devices. In an example, the known distance between the first and second reference devices may be preconfigured or predetermined based on known locations for the first and second reference devices (e.g., obtained from a base station almanac or recent positioning fixes of reference UEs, etc.).

Referring to FIG. 14, in some designs, the communications node corresponds to one of the first and second reference devices (e.g., base stations or reference UEs). In other designs, wherein the communications node corresponds to a network entity (e.g., LMF) separate from the first and second reference devices.

Referring to FIG. 14, in a gNB-specific example, the first reference device may correspond to a reference base station (gNB_ref), and the estimated hardware group delay at 1420 may correspond to a residual gNB hardware group delay ($GD_{diff,gNB,i}$) between reference base station (gNB_ref) and the second base station (gNB_i), e.g.:

$$GD_{diff,gNB,i} = RTTi - Distance\_i * 2 \quad \text{Equation 6}$$

whereby RTTi is the estimated distance between the first and second base stations (e.g., gNB_ref and gNB_i), $GD_{diff,gNB,i}$ is the overall group delay error between gNB_ref and gNB_i, and Distance_i is the known distance between the first and second base stations (e.g., obtained based on base station almanac).

In an example, an RTT measurement between the first reference device (reference gNB) and the second reference device (gNB_i) may be implemented as follows:
- Reference gNB transmits first reference signal for positioning (RS-P_1) to gNB_i at T_1,
- After reception of the RS-P from the reference gNB at T_2, gNB_i transmits second reference signal for positioning (RS-P_2) at T_3,
- gNB_i reports Rx-Tx time difference T_3-T_2 to the network (e.g., LMF, reference gNB, etc.),
- After reception of RS-P_2 from gNB_i at T_4, the reference gNB reports it Rx-Tx time difference T4-T_1 to the network (e.g., LMF),
- Network (e.g., LMF) derives the RTT (RTTi) as T_4-T_1-T_3+T_2.

As noted above, the reference device(s) may alternatively correspond to reference UE(s), instead of gNBs. Moreover, while an RTT-specific example is provided above, in other designs the positioning procedure may be non-RTT, such as TDOA.

In some designs, the process 1400 of FIG. 14 may be implemented between a designated reference device (e.g., gNB or reference UE) and a plurality of other reference devices (e.g., each other gNB or reference UE associated with a positioning procedure, such as differential RTT positioning procedure, for a particular UE). In other designs, the process 1400 of FIG. 14 may be performed only for reference devices that have a direct LOS connection to the designated reference device. In other designs, the process 1400 of FIG. 14 may be performed on a periodic basis rather than being event-triggered based on a positioning procedure.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a communications node, comprising: obtaining a hardware group delay calibration capability associated with each of a plurality of reference devices; selecting a reference device from among the plurality of reference devices based at least on the hardware group delay calibration capabilities associated with the plurality of reference devices; and determining one or more timing measurements associated with each of the plurality of reference devices based on a reference hardware group delay calibration value associated with the selected reference device.

Clause 2. The method of clause 1, wherein the plurality of reference devices comprise at least one base station, at least one reference UE, or a combination thereof.

Clause 3. The method of any of clauses 1 to 2, further comprising: transmitting a hardware group delay calibration capability request to each of the plurality of reference devices, wherein the obtaining comprises receiving the hardware group delay calibration capability for each of the plurality of reference devices in response to the request.

Clause 4. The method of any of clauses 1 to 3, wherein the determination is performed in association with a positioning procedure for a user equipment (UE).

Clause 5. The method of clause 4, wherein the communications node corresponds to the UE, and wherein the positioning procedure is a UE-based positioning procedure.

Clause 6. The method of any of clauses 4 to 5, wherein the communications node corresponds to a network device, and wherein the positioning procedure is a network-based positioning procedure.

Clause 7. The method of any of clauses 4 to 6, wherein the positioning procedure corresponds to a round trip time (RTT) positioning procedure.

Clause 8. The method of clause 7, wherein the positioning procedure corresponds to a differential RTT positioning procedure or a double differential RTT positioning procedure.

Clause 9. The method of any of clauses 4 to 8, wherein the positioning procedure corresponds to a time difference of arrival (TDOA)-based positioning procedure.

Clause 10. The method of any of clauses 1 to 9, wherein the determination is performed independent of any UE positioning procedure.

Clause 11. The method of any of clauses 1 to 10, wherein the hardware group delay calibration capabilities for each of the plurality of reference devices indicates a respective hardware group delay error range.

Clause 12. The method of clause 11, wherein the selecting selects the selected reference device as the reference device associated with the narrowest hardware group delay error range.

Clause 13. The method of any of clauses 1 to 12, wherein the selecting selects the selected reference device based on the hardware group delay calibration capabilities associated with the plurality of reference devices and at least one secondary criteria.

Clause 14. The method of any of clauses 11 to 13, wherein the at least one secondary criteria comprises reference signal received power (RSRP) measurements between the plurality of reference devices and a user equipment (UE).

Clause 15. The method of any of clauses 1 to 14, wherein the hardware group delay calibration capability for at least one of the plurality of reference devices is specific to a particular set of frequency-domain resources, a particular set of beams, a particular transmission reception point (TRP).

Clause 16. The method of any of clauses 1 to 15, wherein the hardware group delay calibration capability for at least one of the plurality of reference devices is time-varying, and wherein the obtaining obtains at least one parameter for modeling a time-varying function of the hardware group delay calibration capability the at least one reference device.

Clause 17. The method of any of clauses 1 to 16, wherein the obtaining comprises receipt of differential hardware group delay calibration capability information that is relative to previously received hardware group delay calibration capability information.

Clause 18. A method of operating a communications node, comprising: obtaining an estimated distance between a first reference device and a second reference device that is based on one or more timing measurements of one or more reference signals for positioning between the first and second reference devices; and estimating a hardware group delay associated with the first and second reference devices based on (i) the estimated distance between the first and second reference devices, and (ii) a known distance between the first and second reference devices.

Clause 19. The method of clause 18, wherein the first and second reference devices comprise at least one base station, at least one reference user equipment (UE), or a combination thereof.

Clause 20. The method of any of clauses 18 to 19, wherein the communications node corresponds to one of the first and second reference devices, or wherein the communications node corresponds to a network entity separate from the first and second reference devices.

Clause 21. The method of any of clauses 18 to 20, wherein the one or more timing measurements are associated with a round trip time (RTT) measurement or a time difference of arrival (TDOA) measurement.

Clause 22. The method of any of clauses 18 to 21, wherein the first reference device is associated with a reference hardware group delay.

Clause 23. The method of clause 22, wherein the estimating estimates a residual hardware group delay that corresponds to a differential between a hardware group delay of the second reference device and the reference hardware group delay of the first reference device.

Clause 24. A communications node, comprising: a memory; at least one transceiver; and at least one processor communicatively coupled to the memory and the at least one transceiver, the at least one processor configured to: obtain a hardware group delay calibration capability associated with each of a plurality of reference devices; select a reference device from among the plurality of reference devices based at least on the hardware group delay calibration capabilities associated with the plurality of reference devices; and determine one or more timing measurements associated with each of the plurality of reference devices based on a reference hardware group delay calibration value associated with the selected reference device.

Clause 25. The communications node of clause 24, wherein the plurality of reference devices comprise at least one base station, at least one reference UE, or a combination thereof.

Clause 26. The communications node of any of clauses 24 to 25, wherein the at least one processor is further configured to: transmit, via the at least one transceiver, a hardware group delay calibration capability request to each of the plurality of reference devices, wherein the obtaining comprises receiving the hardware group delay calibration capability for each of the plurality of reference devices in response to the request.

Clause 27. The communications node of any of clauses 24 to 26, wherein the determination is performed in association with a positioning procedure for a user equipment (UE).

Clause 28. The communications node of clause 27, wherein the communications node corresponds to the UE, and wherein the positioning procedure is a UE-based positioning procedure.

Clause 29. The communications node of any of clauses 27 to 28, wherein the communications node corresponds to a network device, and wherein the positioning procedure is a network-based positioning procedure.

Clause 30. The communications node of any of clauses 27 to 29, wherein the positioning procedure corresponds to a round trip time (RTT) positioning procedure.

Clause 31. The communications node of clause 30, wherein the positioning procedure corresponds to a differential RTT positioning procedure or a double differential RTT positioning procedure.

Clause 32. The communications node of any of clauses 27 to 31, wherein the positioning procedure corresponds to a time difference of arrival (TDOA)-based positioning procedure.

Clause 33. The communications node of any of clauses 24 to 32, wherein the determination is performed independent of any UE positioning procedure.

Clause 34. The communications node of any of clauses 24 to 33, wherein the hardware group delay calibration capabilities for each of the plurality of reference devices indicates a respective hardware group delay error range.

Clause 35. The communications node of clause 34, wherein the selecting selects the selected reference device as the reference device associated with the narrowest hardware group delay error range.

Clause 36. The communications node of any of clauses 24 to 35, wherein the selecting selects the selected reference device based on the hardware group delay calibration capabilities associated with the plurality of reference devices and at least one secondary criteria.

Clause 37. The communications node of any of clauses 34 to 36, wherein the at least one secondary criteria comprises reference signal received power (RSRP) measurements between the plurality of reference devices and a user equipment (UE).

Clause 38. The communications node of any of clauses 24 to 37, wherein the hardware group delay calibration capability for at least one of the plurality of reference devices is specific to a particular set of frequency-domain resources, a particular set of beams, a particular transmission reception point (TRP).

Clause 39. The communications node of any of clauses 24 to 38, wherein the hardware group delay calibration capability for at least one of the plurality of reference devices is time-varying, and wherein the obtaining obtains at least one parameter for modeling a time-varying function of the hardware group delay calibration capability the at least one reference device.

Clause 40. The communications node of any of clauses 24 to 39, wherein the obtaining comprises receipt of differential hardware group delay calibration capability information that is relative to previously received hardware group delay calibration capability information.

Clause 41. A communications node, comprising: a memory; at least one transceiver; and at least one processor communicatively coupled to the memory and the at least one transceiver, the at least one processor configured to: obtain an estimated distance between a first reference device and a second reference device that is based on one or more timing measurements of one or more reference signals for positioning between the first and second reference devices; and estimate a hardware group delay associated with the first and second reference devices based on (i) the estimated distance between the first and second reference devices, and (ii) a known distance between the first and second reference devices.

Clause 42. The communications node of clause 41, wherein the first and second reference devices comprise at least one base station, at least one reference user equipment (UE), or a combination thereof.

Clause 43. The communications node of any of clauses 41 to 42, wherein the communications node corresponds to one of the first and second reference devices, or wherein the communications node corresponds to a network entity separate from the first and second reference devices.

Clause 44. The communications node of any of clauses 41 to 43, wherein the one or more timing measurements are associated with a round trip time (RTT) measurement or a time difference of arrival (TDOA) measurement.

Clause 45. The communications node of any of clauses 41 to 44, wherein the first reference device is associated with a reference hardware group delay.

Clause 46. The communications node of clause 45, wherein the estimating estimates a residual hardware group delay that corresponds to a differential between a hardware group delay of the second reference device and the reference hardware group delay of the first reference device.

Clause 47. A communications node, comprising: means for obtaining a hardware group delay calibration capability associated with each of a plurality of reference devices; means for selecting a reference device from among the plurality of reference devices based at least on the hardware group delay calibration capabilities associated with the plurality of reference devices; and means for determining one or more timing measurements associated with each of the plurality of reference devices based on a reference hardware group delay calibration value associated with the selected reference device.

Clause 48. The communications node of clause 47, wherein the plurality of reference devices comprise at least one base station, at least one reference UE, or a combination thereof.

Clause 49. The communications node of any of clauses 47 to 48, further comprising: means for transmitting a hardware group delay calibration capability request to each of the plurality of reference devices, wherein the obtaining comprises receiving the hardware group delay calibration capability for each of the plurality of reference devices in response to the request.

Clause 50. The communications node of any of clauses 47 to 49, wherein the determination is performed in association with a positioning procedure for a user equipment (UE).

Clause 51. The communications node of clause 50, wherein the communications node corresponds to the UE, and wherein the positioning procedure is a UE-based positioning procedure.

Clause 52. The communications node of any of clauses 50 to 51, wherein the communications node corresponds to a network device, and wherein the positioning procedure is a network-based positioning procedure.

Clause 53. The communications node of any of clauses 50 to 52, wherein the positioning procedure corresponds to a round trip time (RTT) positioning procedure.

Clause 54. The communications node of clause 53, wherein the positioning procedure corresponds to a differential RTT positioning procedure or a double differential RTT positioning procedure.

Clause 55. The communications node of any of clauses 50 to 54, wherein the positioning procedure corresponds to a time difference of arrival (TDOA)-based positioning procedure.

Clause 56. The communications node of any of clauses 47 to 55, wherein the determination is performed independent of any UE positioning procedure.

Clause 57. The communications node of any of clauses 47 to 56, wherein the hardware group delay calibration capabilities for each of the plurality of reference devices indicates a respective hardware group delay error range.

Clause 58. The communications node of clause 57, wherein the selecting selects the selected reference device as the reference device associated with the narrowest hardware group delay error range.

Clause 59. The communications node of any of clauses 47 to 58, wherein the selecting selects the selected reference device based on the hardware group delay calibration capabilities associated with the plurality of reference devices and at least one secondary criteria.

Clause 60. The communications node of any of clauses 57 to 59, wherein the at least one secondary criteria comprises reference signal received power (RSRP) measurements between the plurality of reference devices and a user equipment (UE).

Clause 61. The communications node of any of clauses 47 to 60, wherein the hardware group delay calibration capability for at least one of the plurality of reference devices is specific to a particular set of frequency-domain resources, a particular set of beams, a particular transmission reception point (TRP).

Clause 62. The communications node of any of clauses 47 to 61, wherein the hardware group delay calibration capability for at least one of the plurality of reference devices is time-varying, and wherein the obtaining obtains at least one parameter for modeling a time-varying function of the hardware group delay calibration capability the at least one reference device.

Clause 63. The communications node of any of clauses 47 to 62, wherein the obtaining comprises receipt of differential hardware group delay calibration capability information that is relative to previously received hardware group delay calibration capability information.

Clause 64. A communications node, comprising: means for obtaining an estimated distance between a first reference device and a second reference device that is based on one or more timing measurements of one or more reference signals for positioning between the first and second reference devices; and means for estimating a hardware group delay associated with the first and second reference devices based on (i) the estimated distance between the first and second reference devices, and (ii) a known distance between the first and second reference devices.

Clause 65. The communications node of clause 64, wherein the first and second reference devices comprise at least one base station, at least one reference user equipment (UE), or a combination thereof.

Clause 66. The communications node of any of clauses 64 to 65, wherein the communications node corresponds to one of the first and second reference devices, or wherein the communications node corresponds to a network entity separate from the first and second reference devices.

Clause 67. The communications node of any of clauses 64 to 66, wherein the one or more timing measurements are associated with a round trip time (RTT) measurement or a time difference of arrival (TDOA) measurement.

Clause 68. The communications node of any of clauses 64 to 67, wherein the first reference device is associated with a reference hardware group delay.

Clause 69. The communications node of clause 68, wherein the estimating estimates a residual hardware group delay that corresponds to a differential between a hardware group delay of the second reference device and the reference hardware group delay of the first reference device.

Clause 70. A non-transitory computer-readable medium storing computer-executable instructions that, when executed by a communications node, cause the communications node to: obtain a hardware group delay calibration capability associated with each of a plurality of reference devices; select a reference device from among the plurality of reference devices based at least on the hardware group delay calibration capabilities associated with the plurality of reference devices; and determine one or more timing measurements associated with each of the plurality of reference devices based on a reference hardware group delay calibration value associated with the selected reference device.

Clause 71. The non-transitory computer-readable medium of clause 70, wherein the plurality of reference devices comprise at least one base station, at least one reference UE, or a combination thereof.

Clause 72. The non-transitory computer-readable medium of any of clauses 70 to 71, wherein the one or more instructions further cause the communications node to: transmit a hardware group delay calibration capability request to each of the plurality of reference devices, wherein the obtaining comprises receiving the hardware group delay calibration capability for each of the plurality of reference devices in response to the request.

Clause 73. The non-transitory computer-readable medium of any of clauses 70 to 72, wherein the determination is performed in association with a positioning procedure for a user equipment (UE).

Clause 74. The non-transitory computer-readable medium of clause 73, wherein the communications node corresponds to the UE, and wherein the positioning procedure is a UE-based positioning procedure.

Clause 75. The non-transitory computer-readable medium of any of clauses 73 to 74, wherein the communications node corresponds to a network device, and wherein the positioning procedure is a network-based positioning procedure.

Clause 76. The non-transitory computer-readable medium of any of clauses 73 to 75, wherein the positioning procedure corresponds to a round trip time (RTT) positioning procedure.

Clause 77. The non-transitory computer-readable medium of clause 76, wherein the positioning procedure corresponds to a differential RTT positioning procedure or a double differential RTT positioning procedure.

Clause 78. The non-transitory computer-readable medium of any of clauses 73 to 77, wherein the positioning procedure corresponds to a time difference of arrival (TDOA)-based positioning procedure.

Clause 79. The non-transitory computer-readable medium of any of clauses 70 to 78, wherein the determination is performed independent of any UE positioning procedure.

Clause 80. The non-transitory computer-readable medium of any of clauses 70 to 79, wherein the hardware group delay calibration capabilities for each of the plurality of reference devices indicates a respective hardware group delay error range.

Clause 81. The non-transitory computer-readable medium of clause 80, wherein the selecting selects the selected reference device as the reference device associated with the narrowest hardware group delay error range.

Clause 82. The non-transitory computer-readable medium of any of clauses 70 to 81, wherein the selecting selects the selected reference device based on the hardware group delay calibration capabilities associated with the plurality of reference devices and at least one secondary criteria.

Clause 83. The non-transitory computer-readable medium of any of clauses 80 to 82, wherein the at least one secondary criteria comprises reference signal received power (RSRP) measurements between the plurality of reference devices and a user equipment (UE).

Clause 84. The non-transitory computer-readable medium of any of clauses 70 to 83, wherein the hardware group delay calibration capability for at least one of the plurality of reference devices is specific to a particular set of frequency-domain resources, a particular set of beams, a particular transmission reception point (TRP).

Clause 85. The non-transitory computer-readable medium of any of clauses 70 to 84, wherein the hardware group delay calibration capability for at least one of the plurality of reference devices is time-varying, and wherein the obtaining obtains at least one parameter for modeling a time-varying function of the hardware group delay calibration capability the at least one reference device.

Clause 86. The non-transitory computer-readable medium of any of clauses 70 to 85, wherein the obtaining comprises receipt of differential hardware group delay calibration capability information that is relative to previously received hardware group delay calibration capability information.

Clause 87. A non-transitory computer-readable medium storing computer-executable instructions that, when executed by a communications node, cause the communications node to: obtain an estimated distance between a first reference device and a second reference device that is based on one or more timing measurements of one or more reference signals for positioning between the first and second reference devices; and estimate a hardware group delay associated with the first and second reference devices based on (i) the estimated distance between the first and second reference devices, and (ii) a known distance between the first and second reference devices.

Clause 88. The non-transitory computer-readable medium of clause 87, wherein the first and second reference devices comprise at least one base station, at least one reference user equipment (UE), or a combination thereof.

Clause 89. The non-transitory computer-readable medium of any of clauses 87 to 88, wherein the communications node corresponds to one of the first and second reference devices, or wherein the communications node corresponds to a network entity separate from the first and second reference devices.

Clause 90. The non-transitory computer-readable medium of any of clauses 87 to 89, wherein the one or more timing measurements are associated with a round trip time (RTT) measurement or a time difference of arrival (TDOA) measurement.

Clause 91. The non-transitory computer-readable medium of any of clauses 87 to 90, wherein the first reference device is associated with a reference hardware group delay.

Clause 92. The non-transitory computer-readable medium of clause 91, wherein the estimating estimates a residual hardware group delay that corresponds to a differential between a hardware group delay of the second reference device and the reference hardware group delay of the first reference device.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a communications node, comprising:
obtaining a hardware group delay calibration capability associated with each of a plurality of reference devices, wherein each hardware group calibration capability comprises a capability of the respective reference device to calibrate for time drift in a time-varying hardware group delay associated with the respective reference device, wherein the time drift corresponds to a residual error between hardware group delays associated with the respective reference device at different times;
selecting a reference device from among the plurality of reference devices based at least on the hardware group delay calibration capabilities associated with the plurality of reference devices; and
determining one or more timing measurements associated with each of the plurality of reference devices based on a reference hardware group delay calibration value associated with the selected reference device.

2. The method of claim 1, wherein the plurality of reference devices comprise at least one wireless network component, at least one reference UE, or a combination thereof.

3. The method of claim 1, further comprising:
transmitting a hardware group delay calibration capability request to each of the plurality of reference devices, wherein the obtaining comprises receiving the hardware group delay calibration capability for each of the plurality of reference devices in response to the request.

4. The method of claim 1, wherein the determination is performed in association with a positioning procedure for a user equipment (UE).

5. The method of claim 4,
wherein the communications node corresponds to the UE, and
wherein the positioning procedure is a UE-based positioning procedure.

6. The method of claim 4,
wherein the communications node corresponds to a network device, and
wherein the positioning procedure is a network-based positioning procedure.

7. The method of claim 4, wherein the positioning procedure corresponds to a round trip time (RTT) positioning procedure.

8. The method of claim 7,
wherein the positioning procedure corresponds to a differential RTT positioning procedure or a double differential RTT positioning procedure.

9. The method of claim 4, wherein the positioning procedure corresponds to a time difference of arrival (TDOA)-based positioning procedure.

10. The method of claim 1, wherein the determination is performed independent of any UE positioning procedure.

11. The method of claim 1, wherein the hardware group delay calibration capabilities for each of the plurality of reference devices indicates a respective hardware group delay error range.

12. The method of claim 11, wherein the selecting selects the selected reference device as the reference device associated with the narrowest hardware group delay error range.

13. The method of claim 1, wherein the selecting selects the selected reference device based on the hardware group delay calibration capabilities associated with the plurality of reference devices and at least one secondary criteria.

14. The method of claim 13, wherein the at least one secondary criteria comprises reference signal received power (RSRP) measurements between the plurality of reference devices and a user equipment (UE).

15. The method of claim 1, wherein the hardware group delay calibration capability for at least one of the plurality of reference devices is specific to a particular set of frequency-domain resources, a particular set of beams, a particular transmission reception point (TRP).

16. The method of claim 1,
wherein the hardware group delay calibration capability for at least one of the plurality of reference devices is time-varying, and
wherein the obtaining obtains at least one parameter for modeling a time-varying function of the hardware group delay calibration capability the at least one reference device.

17. The method of claim 1, wherein the obtaining comprises receipt of differential hardware group delay calibration capability information that is relative to previously received hardware group delay calibration capability information.

18. A communications node, comprising:
a memory;
at least one transceiver; and
at least one processor communicatively coupled to the memory and the at least one transceiver, the at least one processor configured to:
obtain a hardware group delay calibration capability associated with each of a plurality of reference devices;
select a reference device from among the plurality of reference devices based at least on the hardware group delay calibration capabilities associated with the plurality of reference devices, wherein each hardware group calibration capability comprises a capability of the respective reference device to calibrate for time drift in a time-varying hardware group delay associated with the respective reference device, wherein the time drift corresponds to a residual error between hardware group delays associated with the respective reference device at different times; and
determine one or more timing measurements associated with each of the plurality of reference devices based on a reference hardware group delay calibration value associated with the selected reference device.

19. The communications node of claim 18, wherein the plurality of reference devices comprise at least one wireless network component, at least one reference UE, or a combination thereof.

20. The communications node of claim 18, wherein the determination is performed in association with a positioning procedure for a user equipment (UE).

21. The communications node of claim 18, wherein the hardware group delay calibration capability for at least one of the plurality of reference devices is specific to a particular set of frequency-domain resources, a particular set of beams, a particular transmission reception point (TRP).

* * * * *